United States Patent [19]
Liencres et al.

[11] Patent Number: 5,644,731
[45] Date of Patent: Jul. 1, 1997

[54] METHOD AND APPARATUS FOR HOT PLUGGING/UNPLUGGING A SUB-SYSTEM TO AN ELECTRICALLY POWERED SYSTEM

[75] Inventors: Bjorn Liencres, Palo Alto; Ashok Singhal, Redwood City; Jeff Price, San Jose; Kang S. Lim, Danville, all of Calif.

[73] Assignee: Sun Microsystems, Inc., Mountain View, Calif.

[21] Appl. No.: 499,150

[22] Filed: Jul. 7, 1995

[51] Int. Cl.$^6$ ............................................ G06F 13/20
[52] U.S. Cl. ............................................ 395/283; 395/309
[58] Field of Search ............................ 395/283, 389, 395/282

[56] References Cited

U.S. PATENT DOCUMENTS

| | | | |
|---|---|---|---|
| 4,245,270 | 1/1981 | Busby | 361/58 |
| 5,268,592 | 12/1993 | Bellamy et al. | 307/43 |
| 5,317,697 | 5/1994 | Husak et al. | 395/283 |
| 5,511,171 | 4/1996 | Bowman | 395/283 |
| 5,526,493 | 6/1996 | Shu | 395/283 |

FOREIGN PATENT DOCUMENTS

| | | | |
|---|---|---|---|
| 0 241 905 A3 | 10/1987 | European Pat. Off. | G06F 13/40 |
| 0 402 055 A3 | 12/1990 | European Pat. Off. | G06F 13/40 |
| 0 402 055 A2 | 12/1990 | European Pat. Off. | G06F 13/40 |
| WO93/15459 | 8/1993 | WIPO | G06F 11/00 |

*Primary Examiner*—Ayaz R. Sheikh
*Assistant Examiner*—Jeffrey K. Seto
*Attorney, Agent, or Firm*—Matthew C. Rainey

[57] ABSTRACT

The present invention provides an "alert" interface for a component which can be safely "hot-plugged/unplugged" to an "alert" interconnect of an electrically powered system. The alert interface has a mating edge which includes daughter precharge/ground connectors, a daughter (engage) waning connector, a number of daughter signal connectors and a daughter engage connector. The alert interconnect includes corresponding mother connectors. The respective connectors of the interconnect and the interface are arranged so that they mate in the following exemplary order when the interface is hot-plugged/unplugged to the interconnect: precharge/ground connectors, warning connectors, signal connectors and finally engage connectors. When the daughter (engage) warning connector mates with the mother warning connector, the component sends an "engage warning" signal to the powered system. Eventually, all the signal connectors mate followed by the engage connectors, enabling the component to send an "engaged" signal to the system indicating that all the signal connectors have completely mated. In accordance with another aspect of the invention, the component can also be safely "hot-unplugged" by first, substantially increasing the degree of recess of the daughter engage connector relative to the daughter signal connectors along the mating edge, and second, doubling the daughter engage connector to function as a daughter disengage warning connector.

29 Claims, 17 Drawing Sheets

METHOD AND APPARATUS FOR HOT PLUGGING/UNPLUGGING A SUB-SYSTEM TO AN ELECTRICALLY POWERED SYSTEM

BACKGROUND OF THE INVENTION

1. Field of the Invention

The present invention relates to the field of safe and efficient system reconfiguration. More particularly, the invention relates to the hot plugging of a component into a powered receptacle.

2. Description of the Related Art

As computing technology gradually shifts towards the "network is the computer" paradigm, the need to be able to safely add/delete components of sub-systems of a computer network, i.e., of both individual computers and shared network resources, without a power down becomes increasingly important. The ability of each sub-system of the computer network to remain powered-up and responsive to the rest of the computer network enables the system to be maintained and upgraded while operational, thereby minimizing the down time of the network as a whole. This need is especially crucial in real-time mission-critical systems such as life-support systems and commercial banking systems.

FIG. 1 shows a conventional interconnect 1110 of a system 1100 for hot-plugging an interface 1210 of a component 1200. Interconnect 1110 includes precharge/ground connectors 1111a/b, and a plurality of signal connectors 1113a, 1113b, ... 1113n. Similarly, interface 1210 includes precharge/ground connectors 1211a/b, and a plurality of signal connectors 1213a, 1213b, ... 1213n.

Precharge connector 1211a protrudes along a mating edge of interface 1210 relative to signal connectors 1213a, 1213b, ... 1213n. As a result, when interface 1210 mates with interconnect 1110, precharge connectors 1111a, 1211a mate prior to the engagement of the respective signal connectors. Since electrical signals travel at a much higher speed than mechanical components, it is presumed that by the time the respective signal connectors make contact, signal noise caused by a power-up of component 1200 has decayed to a harmless level.

Unfortunately, the conventional hot-plugging mechanism described above only precharges the circuitry on component 1200, thereby powering up daughter signal connectors 1213a, ... 1213n in undetermined logic levels. Thus, when the mother and daughter signal connectors mate, mothers signal connectors 1113a, ... 1113n, which can be at any one of three logic levels, high, low or transitioning, may be at inconsistent logic levels with respect to the corresponding daughter signal connectors 1213a, 1213b, ... 1213n and may glitch. This is because the "capacitances" of the output/input drivers (not shown) of the respective daughter signal connectors 1213a, 1213b, ... 1213n are uncharged prior to mating. If the resulting glitch(es) on the signal connectors are large enough, they may cause erroneous signals, i.e., signal noise, to propagate on system interconnect 1100.

As a result, the above-described conventional hot-plugging scheme is inflexible and is sensitive to the settling time of signals on signal connectors 1113a, 1113b, ... 1113n, the (mechanical) rate at which component 1200 can be inserted into system 1100 and the signal clock speed of system 1100. Further, the conventional hot-plugging scheme exerts no control over any signals which may be present on interconnect 1110 during hot-plugging and/or hot-unplugging. For example, there is no provision for system 1100 to delay or slow activity on signal connectors 1113a, 1113b, ... 1113n during hot-plugging/unplugging.

While it is possible to design drivers/receivers with enhanced noise immunity, at high system clock speeds, noise immunity becomes prohibitively difficult and/or expensive to achieve. Hence there is a need for a flexible and reliable noise-resistant hot-plugging/unplugging scheme that can be easily adapted to the requirements of different powered systems and components, e.g., different clock speeds and activity pattern, and can be easily implementable at low cost.

SUMMARY OF THE INVENTION

The present invention provides an "alert" interface for a component which can be safely "hot-plugged/unplugged" to an "alert" interconnect of an electrically powered system. The alert interface has a mating edge which includes daughter precharge/ground connectors, a daughter (engage) warning connector, a number of daughter signal connectors and a daughter engage connector. The alert interconnect includes corresponding mother precharge/ground connectors, a mother warning connector, a number of mother signal connectors and a mother engage connector. The interconnect and the interface are "alert" because they provide a warning of an imminent mating (coupling) of the signals connectors and also an indication when the signal connectors have completed mating.

The respective connectors of the interconnect and the interface are arranged so that they mate in the following exemplary order when the interface is hot-plugged/unplugged to the interconnect: precharge/ground connectors, warning connectors, signal connectors and finally engage connectors. In some embodiments, the signal and engage connectors may engage at substantially the same time.

In one embodiment, the daughter precharge/ground connectors protrude relative to all the other daughter connectors along a mating edge of the alert interface. As a result, when the interface begins mating with the interconnect, the first connectors to mate are the respective precharge/ground connectors.

As the interface and interconnect continue mating, the daughter (engage) warning connector which protrudes relative to the daughter signal connectors along the mating edge, mates with the mother warning connector, enabling the component to send an "engage warning" signal to the powered system prior to the mating of the signal connectors. In this implementation, upon receiving the warning signal, the system completes any outstanding transaction(s) affecting the mother signal connectors within a first time interval, after which a quiet period is enforced on the mother signal connectors.

Eventually, all the signal connectors mate. As the interface advances towards the interconnect, the daughter engage connector, which is either level with or slightly recessed relative to the daughter signal connectors along the mating edge, mates with the mother engage connector, enabling the component to send an "engaged" signal to the system indicating that all the signal connectors have mated. In this implementation, upon receiving the engage signal, the system extends the quiet period for a second time interval before terminating the quiet period.

In accordance with another aspect of the invention, the component can also be safely "hot-unplugged" by first, substantially increasing the degree of recess of the daughter engage connector relative to the daughter signal connectors along the mating edge, and second, doubling the daughter engage connector to function as a daughter disengage warning connector. As a result, when the component begins to unplug from the powered system, a "disengage warning" signal can be sent to the system indicating that the signal connectors are about to uncouple.

Further, since the daughter engage warning connector protrudes substantially relative to the daughter signal connectors, by doubling the daughter engage warning connector as a daughter disengage connector, the component is able to send a "disengaged" signal to the system indicating that all the signal connectors have completely uncoupled. Note that the existing hot-plugging circuitry can be used to support the hot-unplugging mechanism.

In another embodiment, the alert interconnect is passive, i.e., it includes passive circuit components, e.g., resistors and capacitors, and does not include any active components, e.g., logic gates. Accordingly, all the active circuitry is located on the respective active alert interfaces of the components.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks and exemplary mother/daughter connectors to assist a circuit designer in implementing a hot plugging/unplugging scheme. In addition, while the present invention is described with reference to specific interconnect for coupling a component to an electrically powered system, the invention is applicable to a wide range of interconnects and system architectures, including integrated circuit (IC) packages, computer sub-systems, peripherals and network interfaces. In other instances, well-known circuits and structures are not described in detail so as not to obscure the invention unnecessarily.

Figure 1:
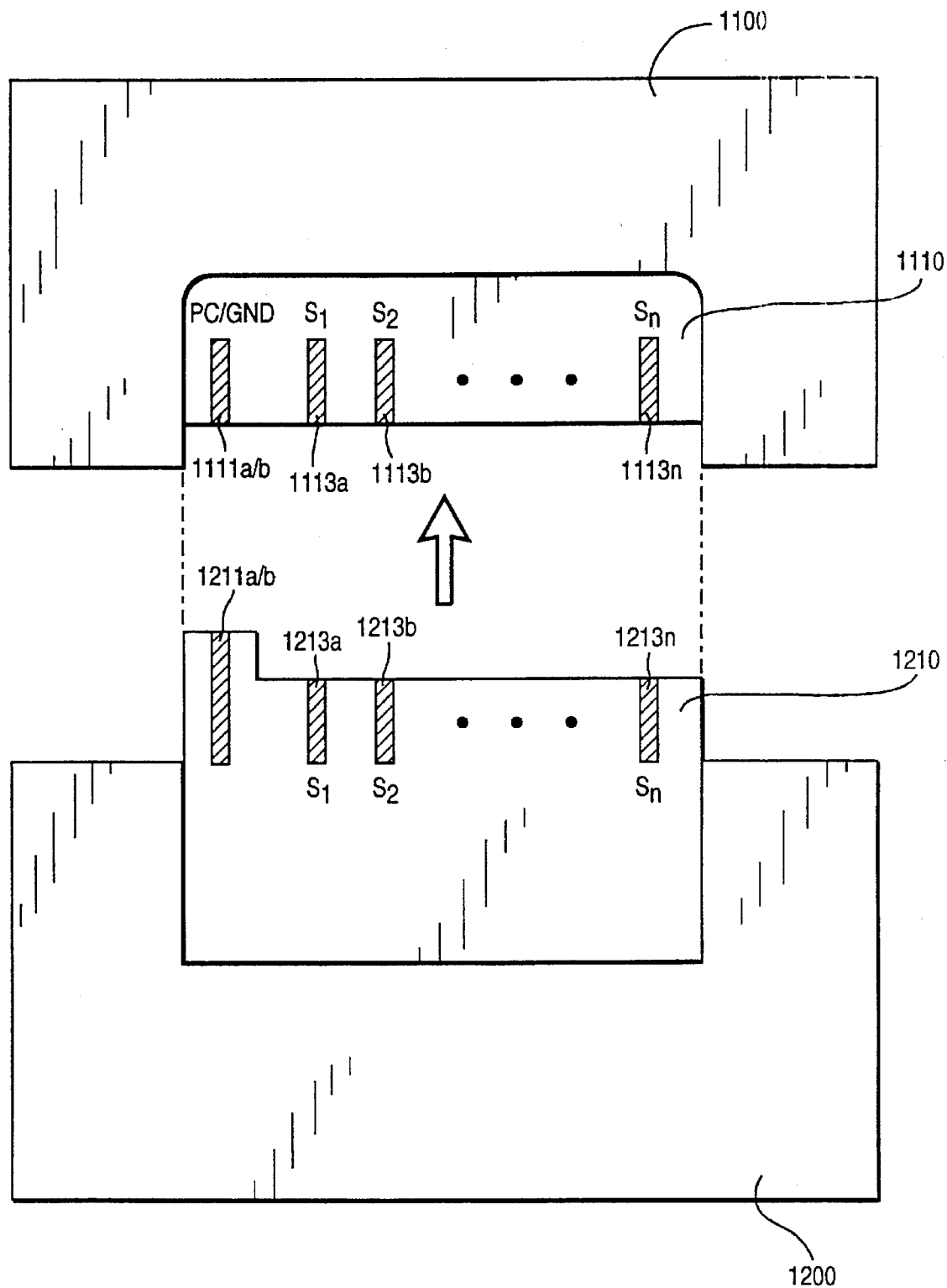
FIG. 1 illustrates a conventional hot plugging scheme.
Figure 2:
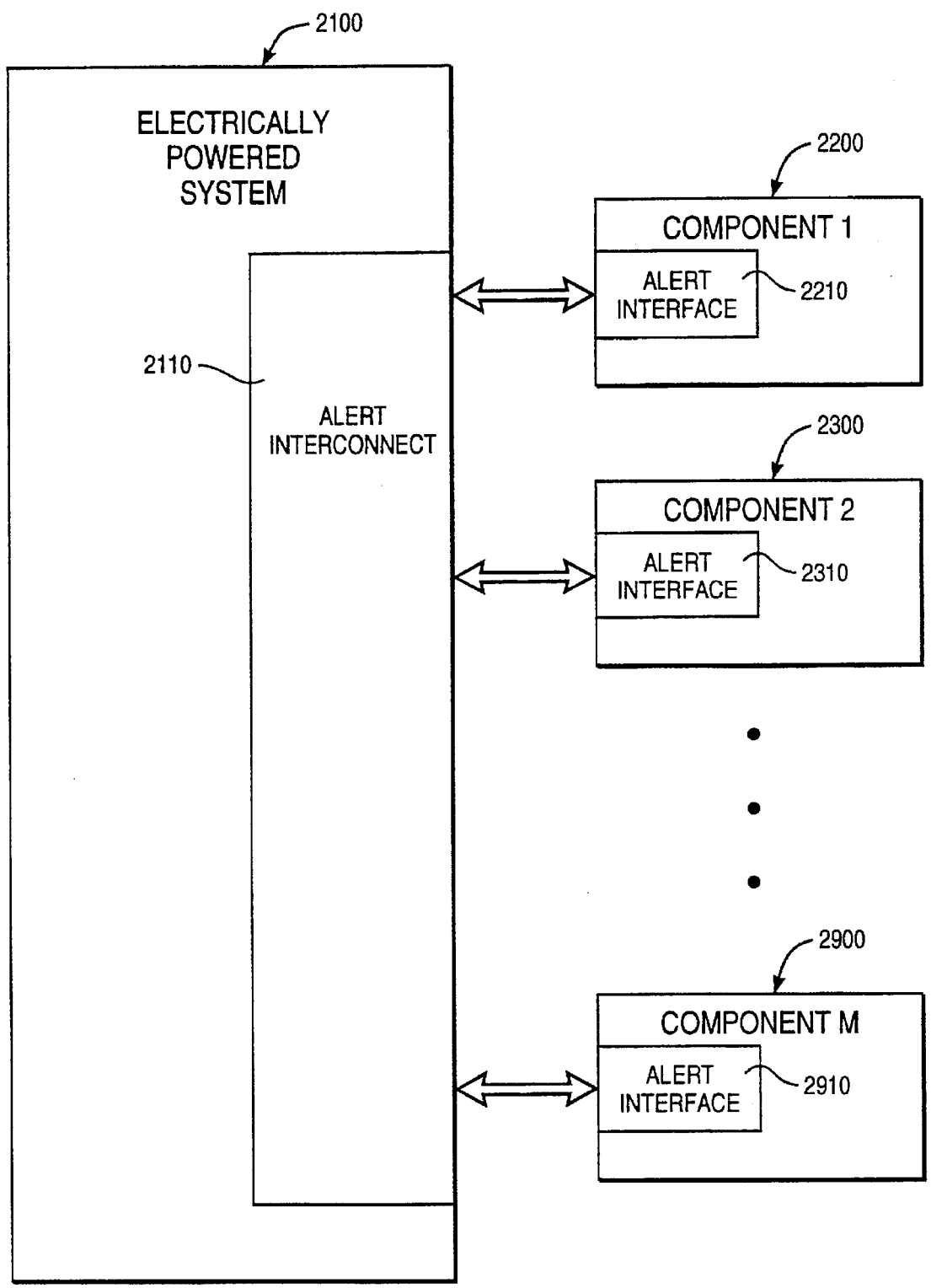
FIG. 2 is a block diagram illustrating a hot plugging/unplugging scheme of the present invention.

In accordance with the-hot plugging scheme of the present invention as shown in FIG. 2, an electrically powered system 2100 includes an alert interconnect 2110 for safely mating the powered system with one or more alert interfaces 2210, 2310, . . . 2910 of components 2200, 2300, . . . 2900, respectively. Since the same hot-plugging mechanism works with components 2200, 2230, . . . 2900, the following description of alert interface 2210 is applicable to alert interfaces 2310 . . . 2910.

Figure 3A:
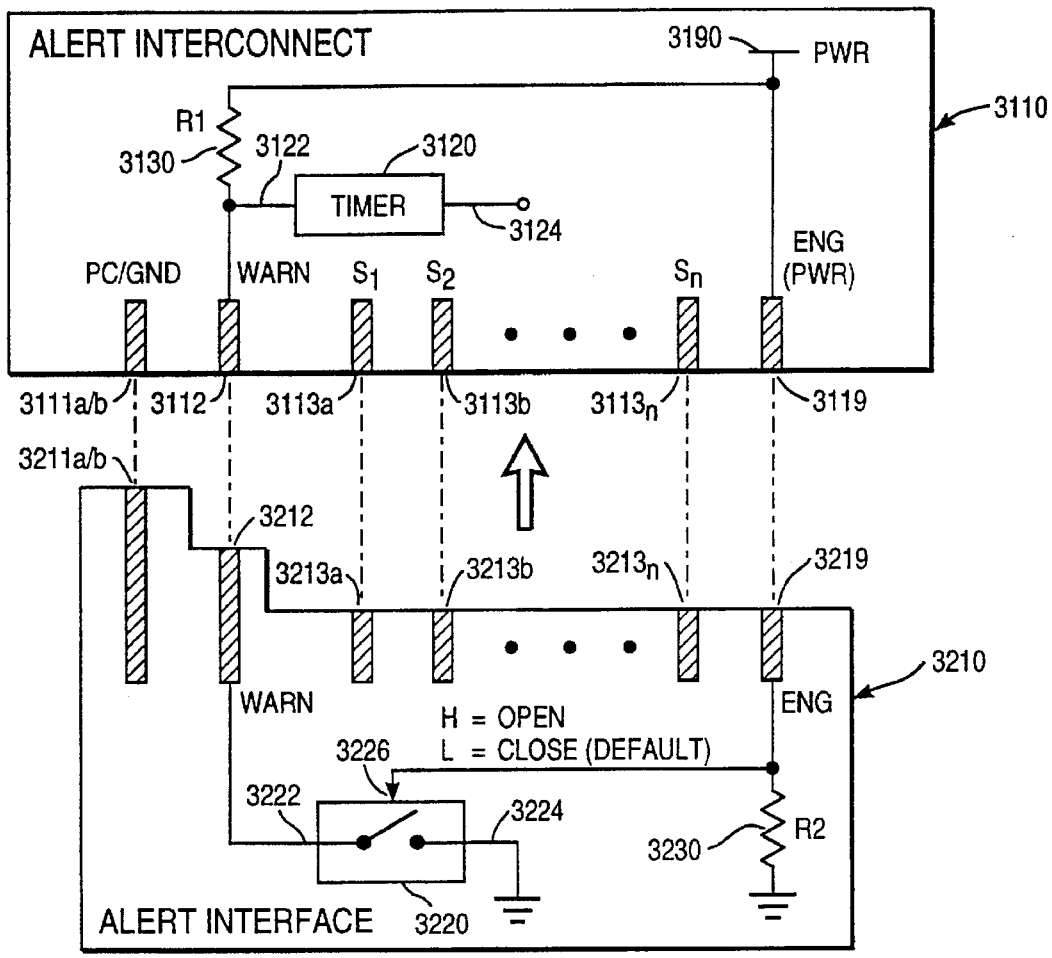
FIG. 3A shows one embodiment of the alert interconnect and the alert interface of FIG. 2.

FIG. 3A shows one embodiment of an alert interconnect 3110 of system 2100 and a corresponding alert interface 3210 of component 2200 suitable for the hot plugging scheme of the present invention.

Alert interconnect 3110 includes a mother precharge (PC) connector 3111$a$, a mother ground (GND) connector 3111$b$ (hidden behind connector 3111$a$), a mother (engage) warning (WARN) connector 3112, a plurality of mother signal connectors 3113$a$, 3113$b$, . . . 3113$n$, and a mother engage (ENG) connector 3119. Interconnect 3110 also includes a timer 3120 and a resistor 3130.

Resistor 3130 is coupled between WARN connector 3112 and a power (PWR) rail 3190 of system 2100. ENG connector 3119 is coupled to PWR rail 3190. An input node 3122 of timer 3120 is coupled to WARN connector 3112.

Alert interface 3210 includes a daughter PC connector 3211$a$, a daughter GND connector 3211$b$ (hidden behind PC connector 3211$a$), a daughter (engage) WARN connector 3212, a plurality of daughter signal connectors 3213$a$, 3213$b$, . . . 3213$n$, and a daughter ENG connector 3219. In addition, interface 3210 includes a switch 3220 and a resistor 3230. Switch 3220 can be an electromechanical, semi-conductor, or any other suitable switch.

Resistor 3230 is coupled between ENG connector 3219 and a GND rail of component 2200. Switch 3220 is coupled between WARN connector 3212 and GND. A control node 3226 of switch is coupled to ENG connector 3219. In this example, switch 3220 is closed when control node 3226 is LOW (logical "low" level).

In this implementation, the connectors of alert interface 3210 are located along a "mating edge" recessed within a female socket/slot. Alert interconnect 3110 includes corresponding male connectors for operatively coupling with the mating edge of alert interface 3210. Other physical implementations are possible. For example, alert interface 3210 may be an irregular male edge of a double-sided printed circuit board (PCB) while alert interconnect 3110 may be a corresponding female socket.

Figure 3B:
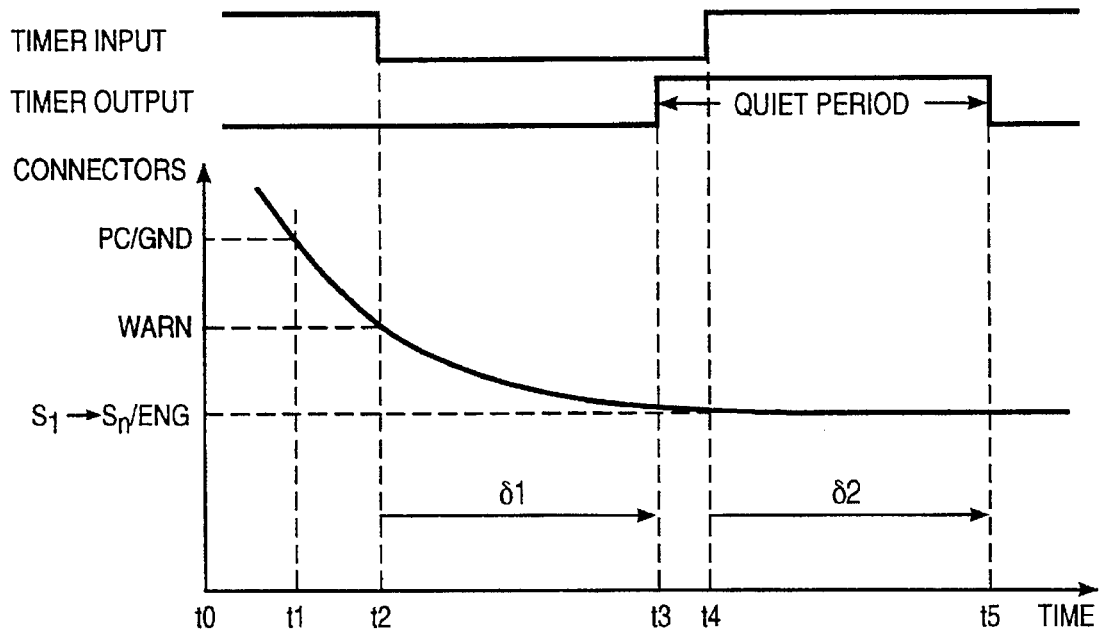
FIG. 3B is a timing diagram illustrating the rate of mating the respective connectors of the embodiment of FIG. 3A.
Figure 3C:
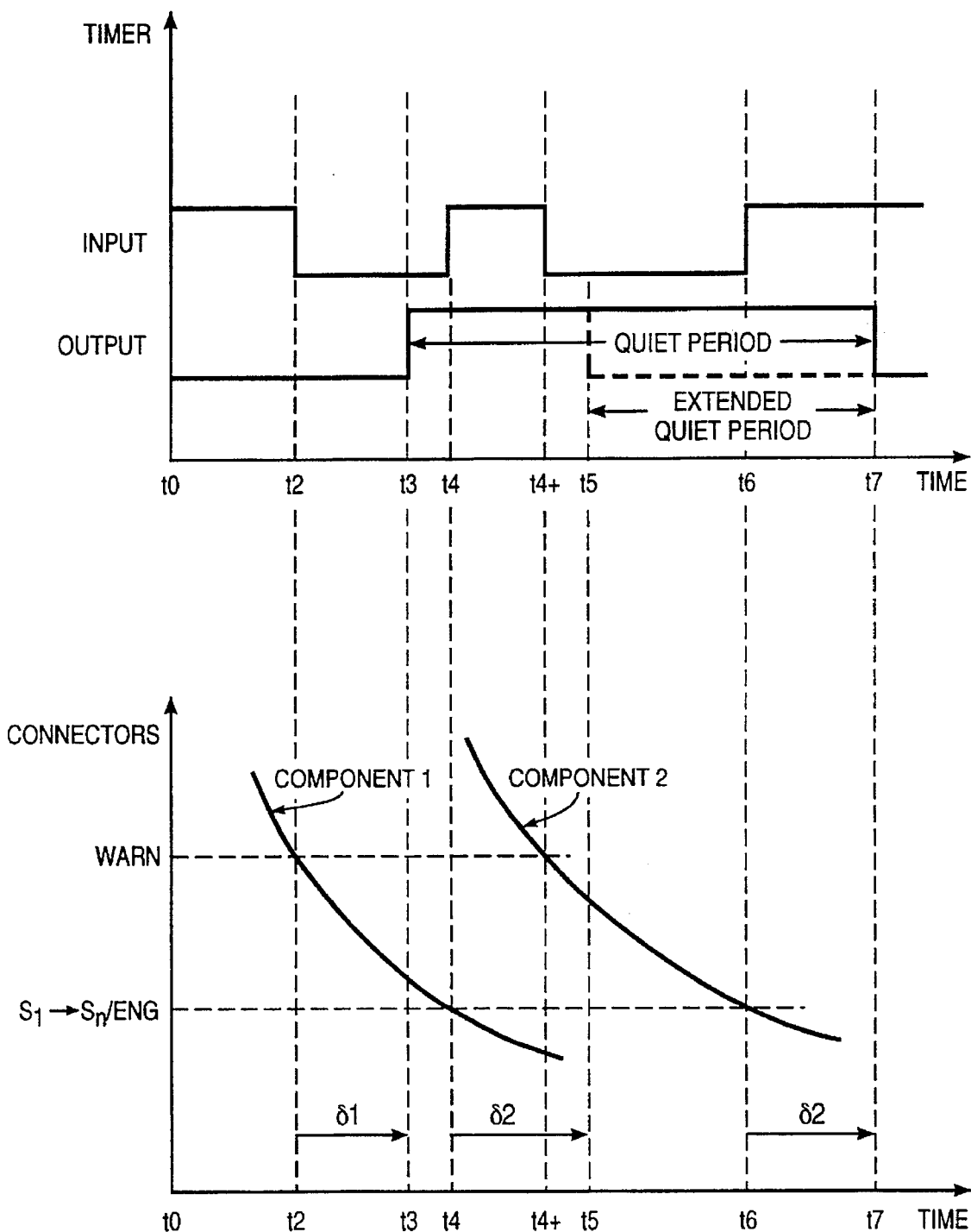
FIG. 3C includes timing diagrams illustrating the mating of two alert interfaces to the alert interconnect of FIG. 2.
Figure 3D:
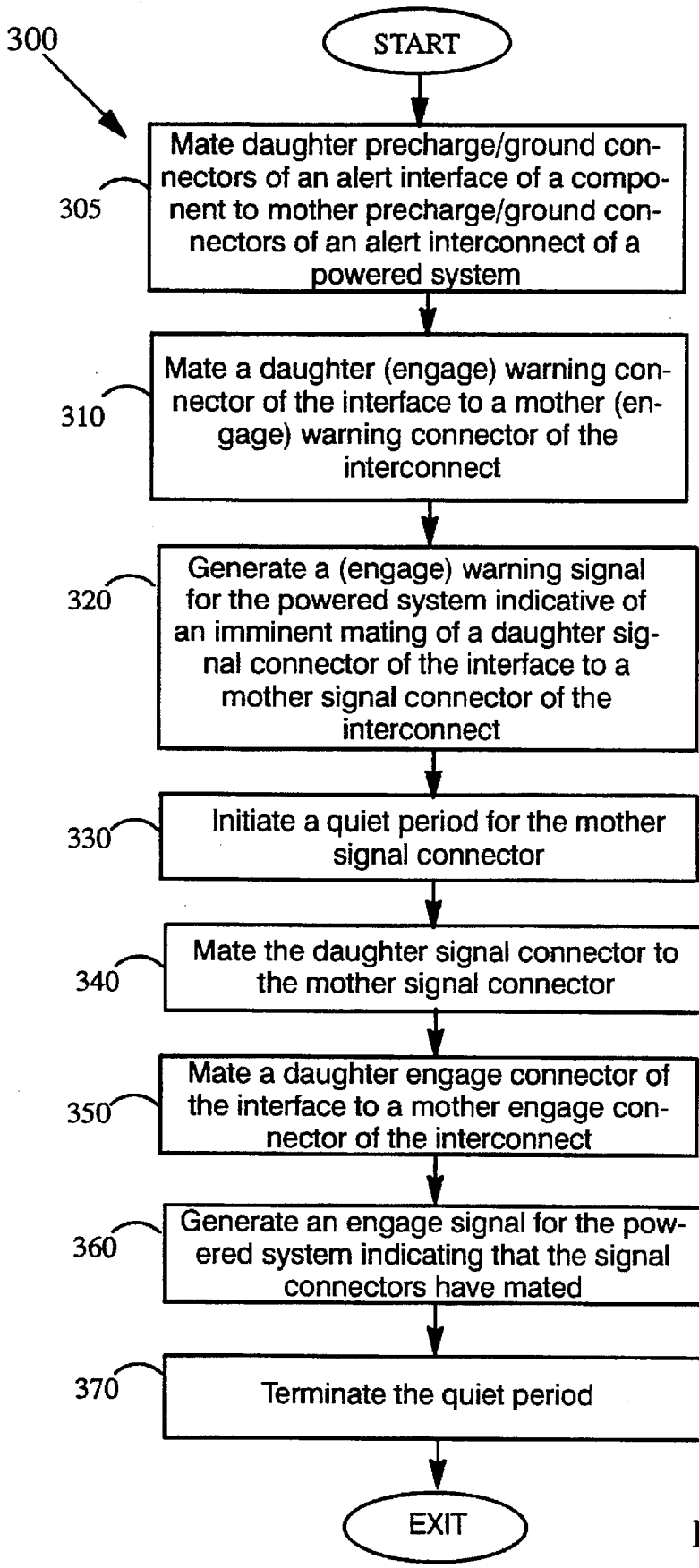
FIG. 3D is a flowchart illustrating the mating of the alert interface in the alert interconnect of FIG. 3A.

Since PC connector 3211$a$ and GND connector 3211$b$ protrude the most relative to the mating edge of interface 3210, followed by WARN connector 3212, and then remaining connectors 3213$a$, 3213$b$, . . . 3213$n$, 3219, mating (coupling) of the respective connectors of interface 3210 to interconnect 3110 occur in the order illustrated by the timing diagram and flowchart of FIGS. 3B and 3D, respectively.

At time t1, the respective PC connector pair 3111$a$, 3211$a$ and GND connector pair 3111$b$, 3211$b$ mate (step 305). Powered system 2100 can now begin precharging component 2200.

Note that prior to time t2, i.e., before ENG connectors 3119, 3219 mate, the voltage of ENG connector 3219 is kept LOW by resistor 3230. Consequently, switch 3220 is closed and WARN connector 3212 is LOW.

As interface 3200 advances towards interconnect 3110, the respective WARN connectors 3112, 3212 mate at time t2 (step 310), and WARN connector 3112 is pulled LOW thereby generating an "engage warning" signal to timer 3120 (step 320). Timer 3120 then signals system 2100 indicating that a mating of signal connector pairs 3113a, 3213a, ... 3113n, 3213n is impending, i.e., imminent, and that any outstanding usage of signal connectors 3113a, ... 3113n by system 2100 should cease within a time interval d1, i.e., between time t2 and t3. Subsequently, a "quiet" period is enforced by timer 3120 beginning at time t3 (step 330).

In accordance with the invention, a critical time period between the mating of WARN connector pair 3112, 3212 and signal connector pairs 3113a, 3213a, ... 3113n, 3213n, i.e., between time t3 and t4, when signals on signal connectors 3113a ... 311b are most likely to be corrupted, is protected by the enforcement of the quiet period. Note that during experimentation using the PCB implementation of interface 3210, the minimum recorded time period for a human subject to quickly insert (slam in) a PCB into a PCB slot is in the order of two milliseconds (msecs). Hence, system 3110 should complete all outstanding transactions involving signal connectors 3113a, 3113b, ... 3113n within two msecs of the mating of the WARN connectors, e.g., d1 can be set to 2 msecs. Accordingly, the protrusion of WARN connector 3212 relative to signal connectors 3213a 3212b, ... 3213n and ENG connector 3219 should commensurate with the rate at which system 3110 is able to cease usage of signal connectors 3113a, 3113b, ... 3113n, upon notification via WARN connector 3112.

Subsequently, the remaining pairs of connectors, i.e., signal connector pairs 3113a, 3213a, 3113n, 3213n and ENG connector pair 3119, 3219 mate (steps 340, 350). In this embodiment, when ENG connectors 3119, 3219 mate, ENG connector 3119, which doubles as a PWR connector, causes ENG connector 3219 to pull control node 3226 of switch 3220 HIGH (logical "high" level). As a result, switch 3220 opens, allowing WARN connector 3112 to be pulled HIGH by resistor 3130, thereby generating an "engaged" signal for an input node 3122 of timer 3120, to indicate the complete mating of signal connector pairs 3113a, 3213a, ... 3113n, 3213n (step 360). Other means for generating and communicating the engaged signal are possible.

Referring again to FIG. 3B, timer 3120 responds to the engaged signal by extending the quiet period for a time interval d2 and then terminating the quiet period at time t5 (step 370). Thus the quiet period is enforced between time t3 and t5. Extending the quiet period to time t5 permits signal connector pairs 3113a, 3213a, ... 3113n, 3213n to settle down electrically before being driven by either interconnect 3110 or interface 3210. For example, d2 can be set to 200 msecs.

Having provided a detailed description the hot plugging of a single component into powered system 2100, the hot plugging of two components into powered system 2100 is now described in detail. As shown in the timing diagram of FIG. 3C, two components, e.g., components 2200, 2300 mate with system 2100 in quick succession. When interface 2210 of the first component 2200 mates with interconnect 2100, timer 3120 enforces the quiet period between time t3 and t5 in the manner described above.

In this example, the second component 2300 begins mating with interconnect 2110 before time t5. When the WARN connector of interface 2310 mates with interconnect 2110 at time t4+, i.e., before the (previous) expiration of the quiet period at time t5, timer 3120 extends the quiet period till the signal and BNG connectors of interface 2310 compete mating with interconnect 2110. In this implementation, timer 3120 further extends the quiet period for a time interval d2 before terminating the extended quiet period at time t7. Extending the quiet period to time t7 permits the signal connectors of interface 2310 to settle down electrically before being driven by either interconnect 2110 or interface 2310.

Figure 4A:
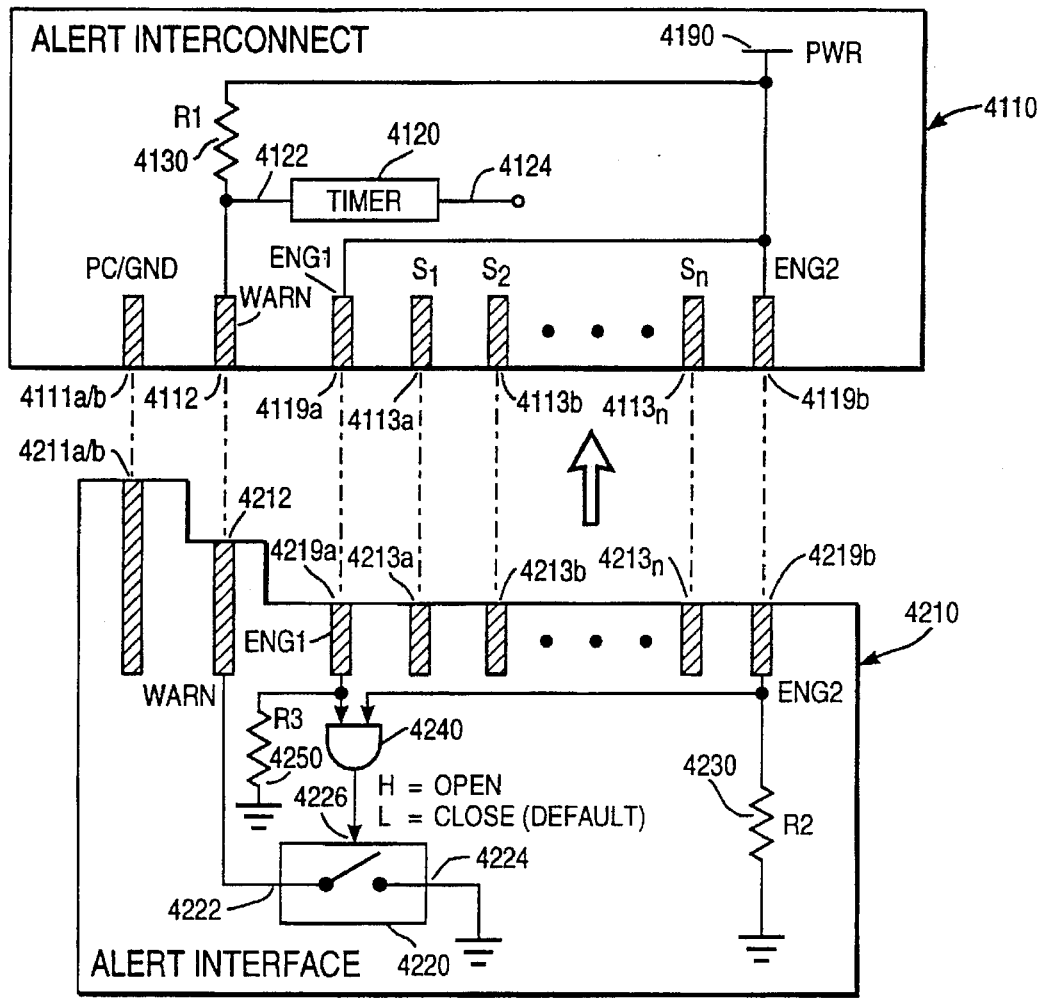
FIG. 4A shows another embodiment of the alert interconnect and the alert interface of FIG. 2.
Figure 4B:
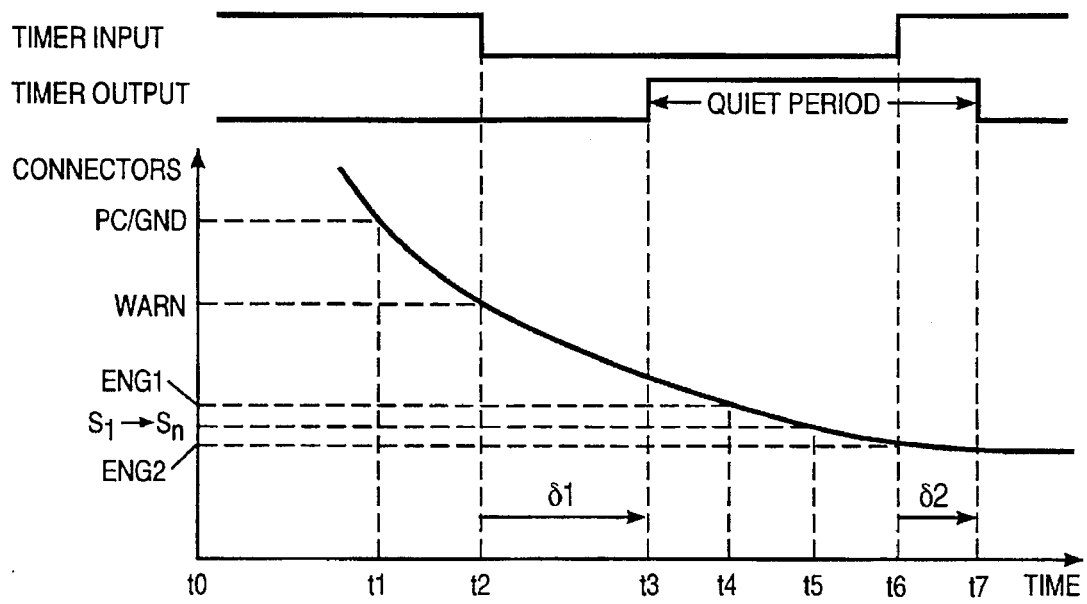
FIG. 4B is a timing diagram illustrating the rate of mating the respective connectors of the embodiment of FIG. 4A.

FIGS. 4A and 4B illustrate another embodiment of an alert interconnect 4110 and a corresponding alert interface 4210 having two engagement connectors, ENG1 and ENG2 connectors 4219a, 4219b, guarding signal connectors 4213a, 4213b, ... 4213n. The advantages of interface 4220 over interface 3220 are best illustrated by emphasizing the differences in the structure and operation between the two embodiments.

Both ENG1/2 connectors 4119a, 4119b of interconnect 4110 are coupled to PWR rail 4190. Resistor 4130 is coupled between WARN connector 4112 and PWR rail 4190. Input node 4122 of timer 4120 is coupled to WARN connector 4112.

Interface 4210 includes a switch 4220, an "AND" gate 4240 and resistors 4230, 4250. Resistors 4250, 4230 are coupled between ENG1/2 connectors 4219a, 4219b and GND, respectively. Switch 4220 is coupled between WARN connector 4212 and GND. A control node 4226 of switch is coupled to the output node of AND gate 4240. The inputs nodes of AND gate 4240 are coupled to the respective ENG1/2 connectors 4219a, 4219b. In this example, switch 4220 is closed when control node 4226 is LOW.

In this example, switch 4220 remains closed until both ENG1 and ENG2 connectors 4219a, 4219b mate with their interconnect counterparts. As shown in the timing diagram of FIG. 4B, the second time interval d2 is extended from the later of the two respective engagements of ENG1/2 connectors 4219a, 4219b, i.e., the later of time t4, t6. In this example, ENG1 connector 4219a engages before ENG2 connector 4219b. Thus, one advantage of having two ENG1/2 connectors 4219a, 4219b located on opposite sides of signal connectors 4213a, 4213b, ... 4213n, is the inherent immunity to a tilted insertion of interface 4210 or a small angular deviation of the mating edge of interface 4210 relative to interconnect 4110.

Figure 5A:
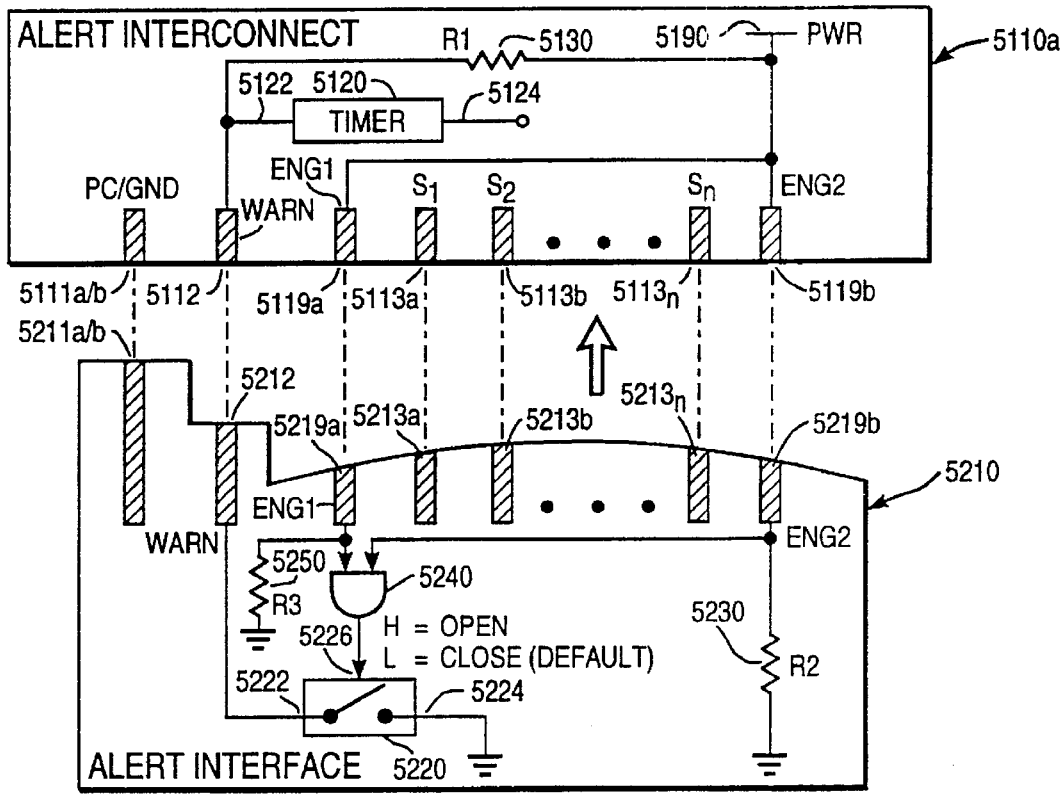
FIGS. 5A and 5B show two additional embodiments of the alert interconnect and the alert interface of FIG. 2.
Figure 5B:
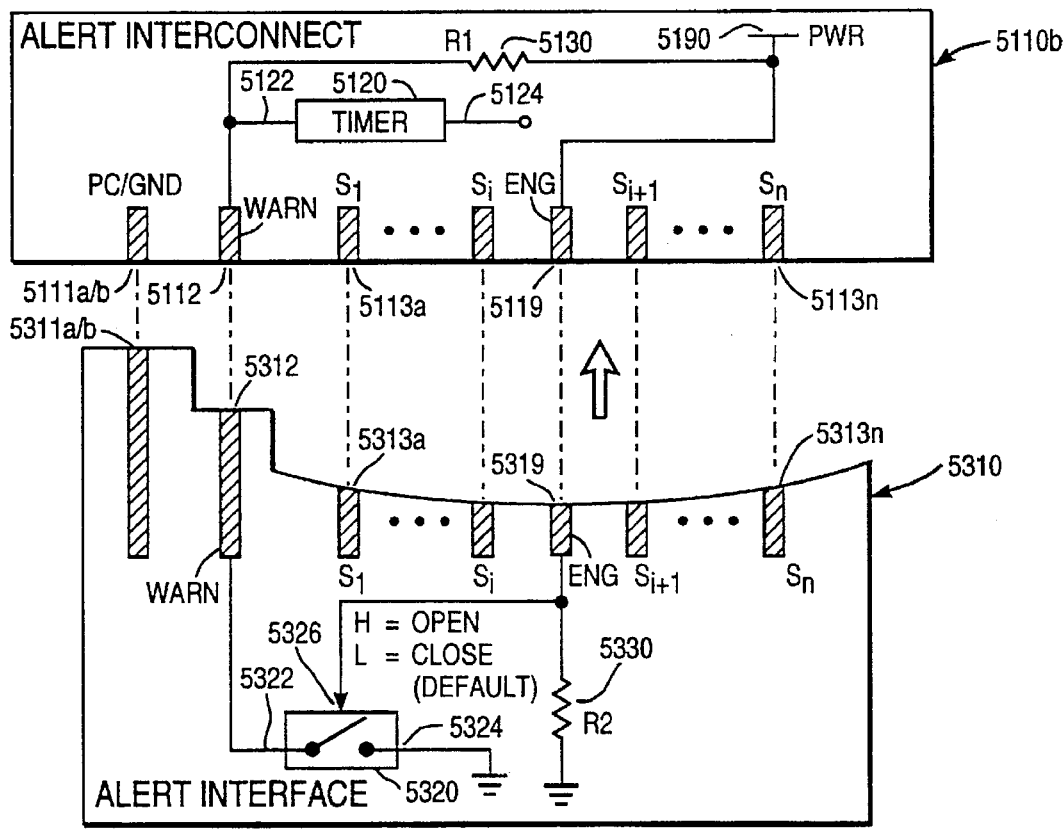

FIGS. 5A and 5B illustrate yet two more embodiments of alert interfaces 5210, 5310 of the present invention. Note the mating edges of interfaces 5210, 5310 are convex and concave, with respect to interconnects 5110a, 5110b, respectively.

In the case of convex interface 5210, connectors located closer to the middle of the mating edge mate before connectors located at the ends of the mating edge. Hence, daughter signal connectors 5213a, 5213b, ... 5213n mate with mother signal connectors 5113a, 5113b, ... 5113n, before either ENG1 or ENG2 connectors 5219a, 5219b.

Conversely, in the case of concave interface 5210, connectors located closer to the ends of the mating edge mate before connectors located at the middle of the mating edge. Hence, daughter signal connectors 5213a, 5213b ... 5213n mate with mother signal connectors 5113a, 5113b, ... 5113n, before either ENG1 or ENG2 connectors 5219a, 5219b.

The operation of interfaces 5210, 5310 are similar to that of interfaces 4200, 3200, respectively. However in both cases, immunity to a tilted insertion of interfaces 5210, 5310 or a small angular deviation of the mating edges of interfaces 5210, 5310 relative to the respective interconnects 5110a, 5110b are substantially improved due to the shape of the interface mating edges.

Figure 5C:
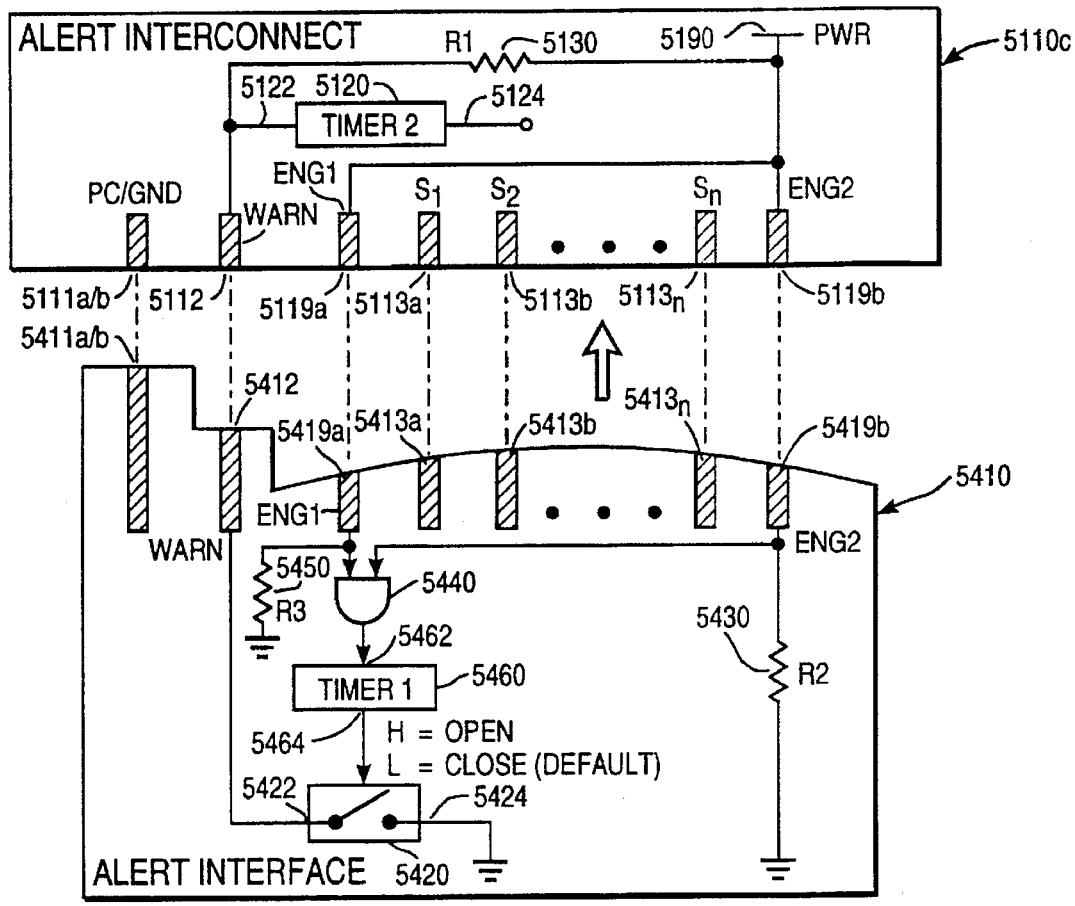
FIGS. 5C and 5D illustrate yet another embodiment of the alert interconnect and the alert interface of FIG. 2.
Figure 5D:
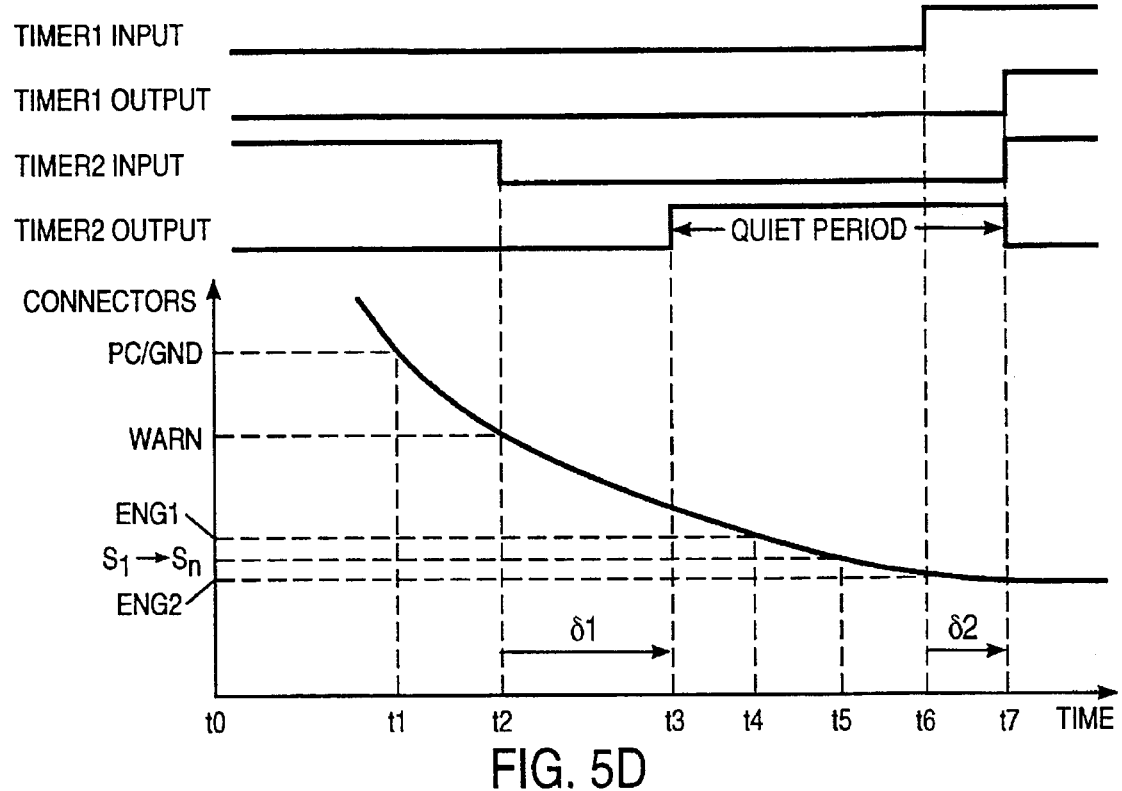

FIG. 5C and 5D illustrate yet another embodiment of alert interconnect 5100c and alert interface 5410 of the present invention. In this implementation, the timing delays for the quiet period are generated by separate timers, timer1 5460 and timer2 5120, located on interconnect 5410 and interface 5110c, respectively.

The above-described signal noise and other related problems can also occur during a "hot-unplugging" of a component from powered system 2100. Although hot-unplugging problems are not as serious as those of hot-plugging, nevertheless, the ability to warn powered system 2100 of an imminent "hot-unplugging" of a component is another useful aspect of the invention. Hence, having described hot-plugging of components 2200, 2300, . . . 2900 into powered system 2100, "hot-unplugging" of these components into system 2100 is now described.

Figure 6A:
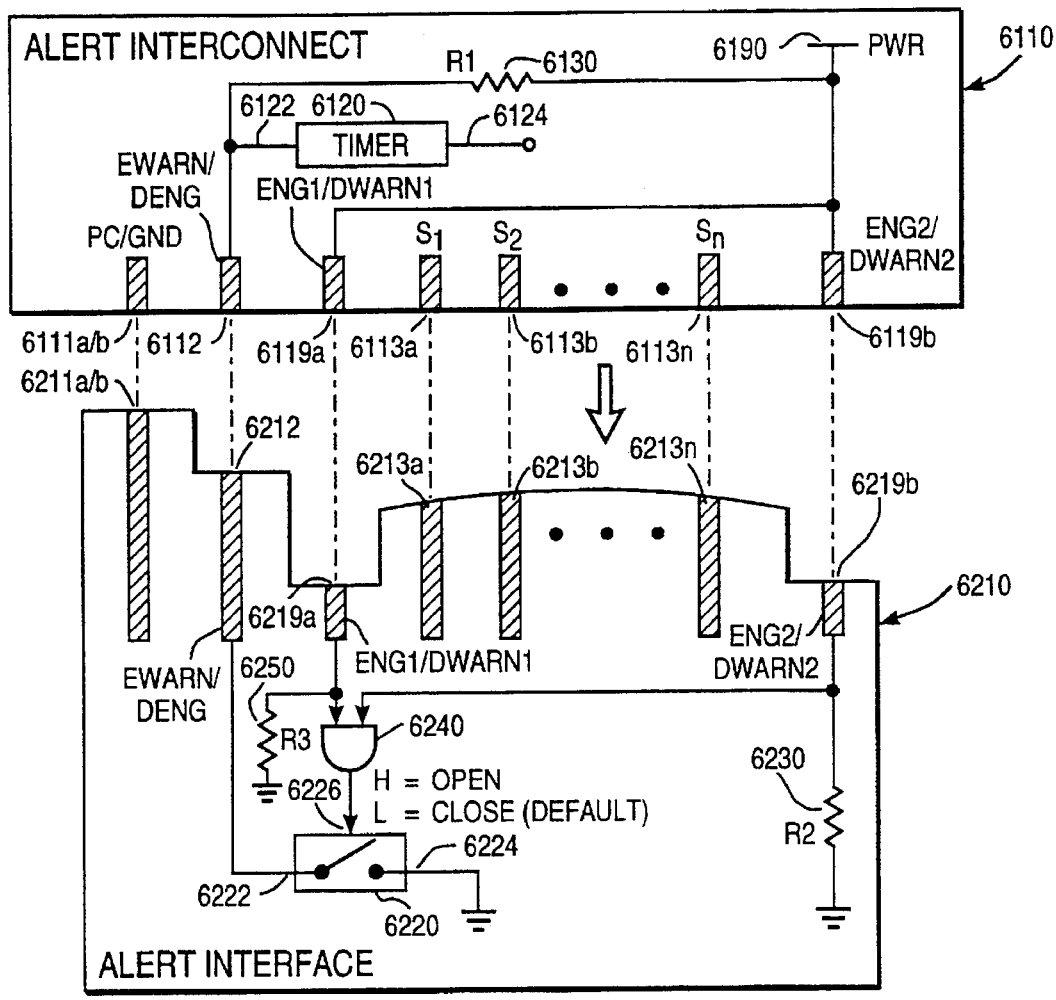
FIGS. 6A and 6B illustrate the hot-plugging/unplugging of another embodiment of the alert interconnect and the alert interface of FIG. 2.
Figure 6B:
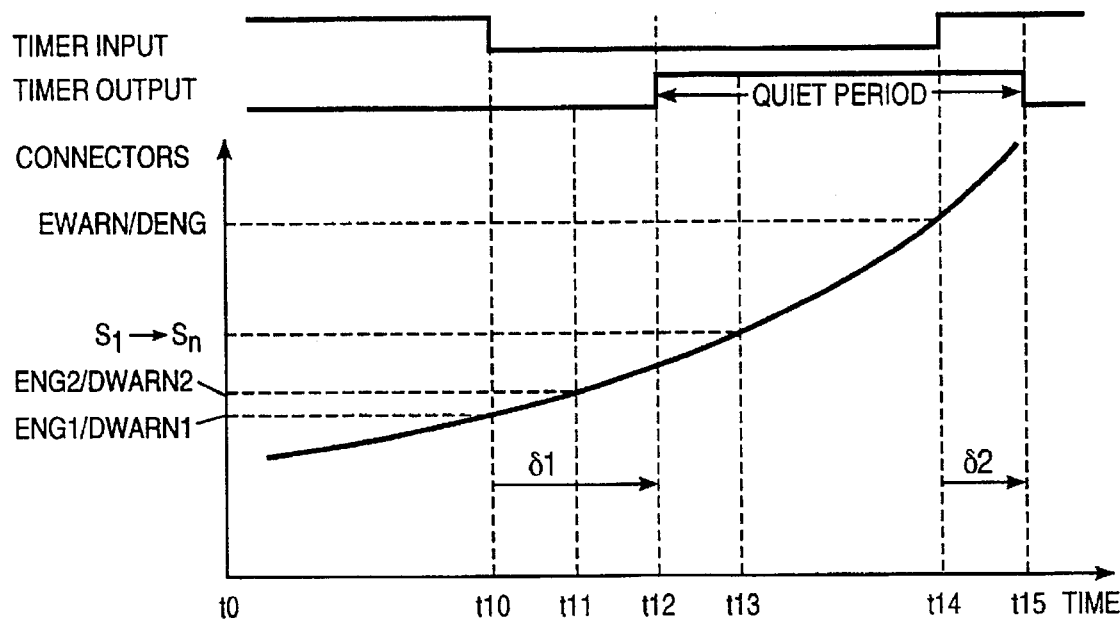
Figure 6C:
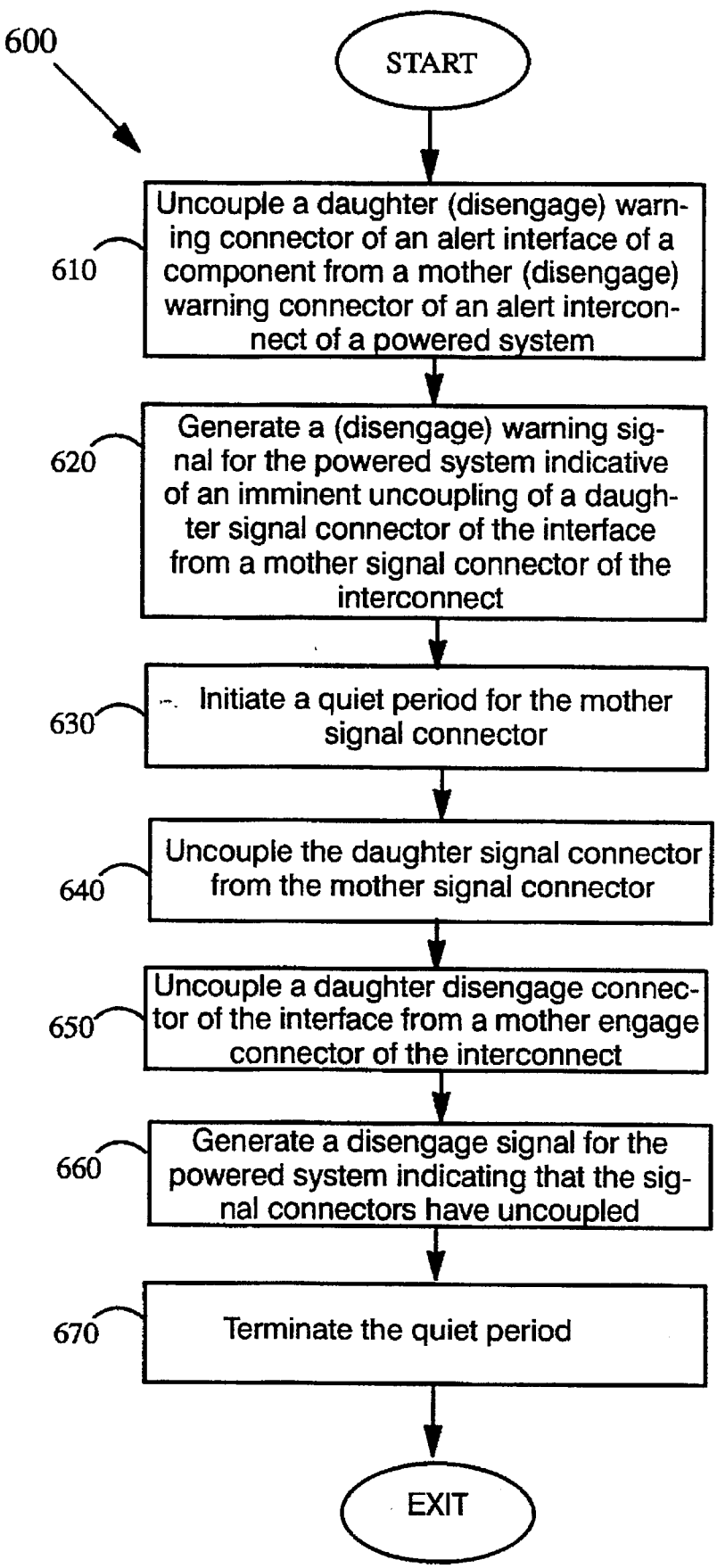
FIG. 6C is a flowchart illustrating the hot-unplugging scheme of the present invention.

FIGS. 6A, 6B and 6C illustrate an embodiment of alert interface 6210 for component 2200 suitable for both hot-plugging and hot-unplugging with system 2100. As shown in FIG. 6A, daughter ENG1/2 connectors 6219a, 6219b of interface 6210 are recessed relative to signal connectors 6213a, . . . 6213n and double as disengage warning (DWARN1/2) connectors in order to provide a disengage warning signal to interconnect 6110 via engage warning (EWARN) connector 6112 which now doubles as a disengage (DENG) connector. Recessing DWARN1/2 connectors 6219a, 6219b ensures that at least one of the two DWARN connectors 6219a, 6219b will uncouple with their respective connectors 6119a, 6119b, before any of signal connectors 6213a, 6213b, . . . 6213n uncouple with connectors 6113a, . . . 6113b, . . . 6113n, respectively. Hot-plugging of interface 6210 is as described above for interface 5210. Hot-unplugging is as descibed below.

In this example, as illustrated by the timing diagram and flowchart of FIGS. 6B and 6C, respectively, when DWARN1 connector 6219a uncouples at time t10 (step 610), the output node of AND gate 6240, coupled to control node 6226 of switch 6220, is driven LOW, causing switch 6220 to close. As a result, a "disengage warning" signal is generate at input node 6122 of timer 6120 (step 620). Timer 6120 signals system 2100 that a DENG is imminent and that all outstanding usage of signal connectors 6113a, 6113b, . . . 6113n should cease within time interval d1. Accordingly, timer 6120 waits for time interval d1 and initiates a quiet period at time t12 (step 630).

As interface 6210 is unplugged further with respect to interconnect 6110, eventually all signal connectors 6213a, 6213b, · . . . 6213n uncouple by time t13 (step 640). Subsequently, at time t14, DENG connector 6212 uncouples (step 650), allowing input node 6122 of timer 6120 to be pulled HIGH by resistor 6130, thereby causing a "disengaged" signal to be generated for system 2100 (step 660). Timer 6120 extends the quiet period for time interval d2 before terminating the quiet period (step 670). Hence, by recessing ENG1/DWARN1 and ENG2/DWARN2 connectors 6219a, 6219b, interface 6210 can be advantageously safely hot-unplugged from interconnect 6110 without any additional circuitry.

Figure 7:
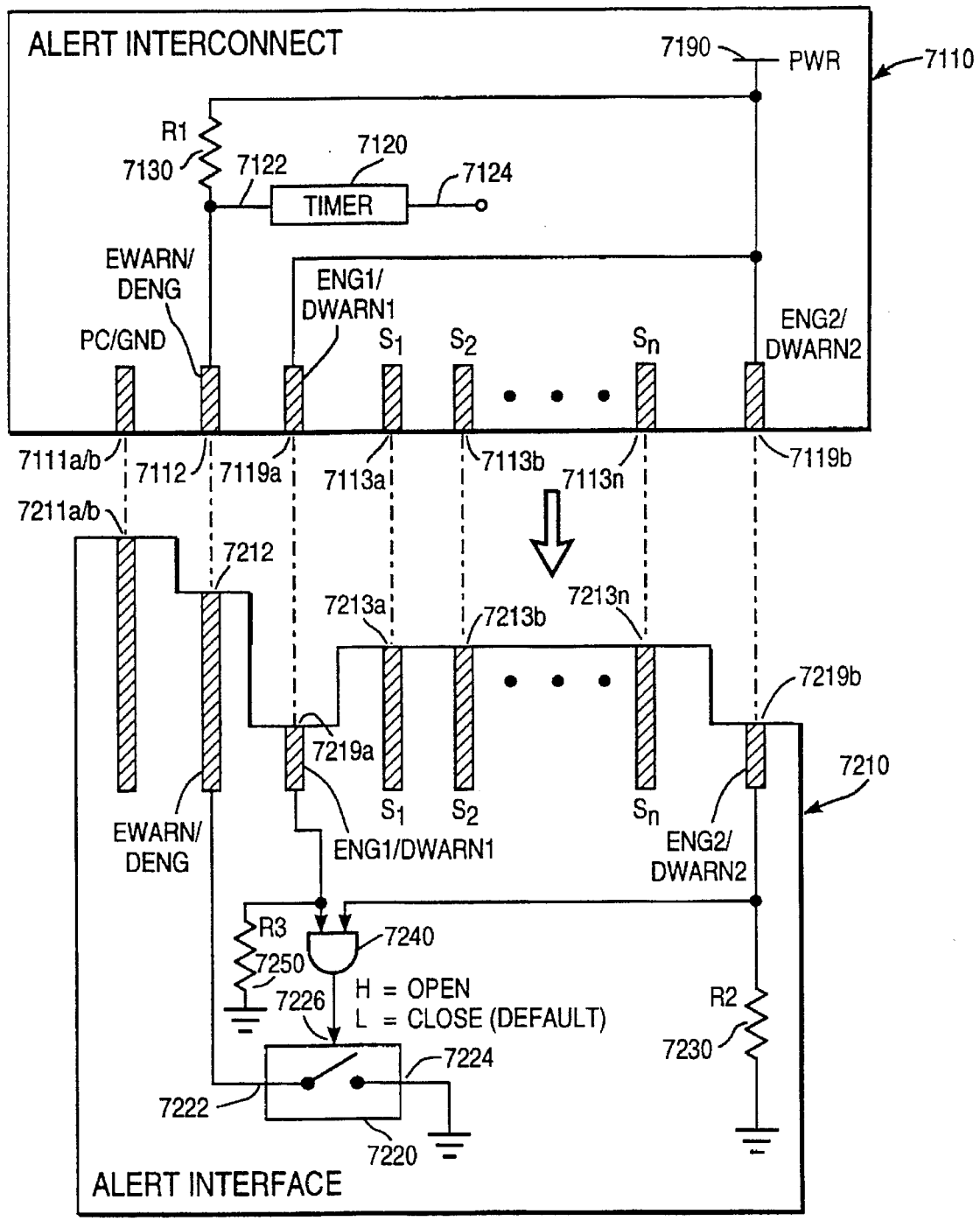
FIGS. 7 and 8 show two additional hot-plugging/unplugging embodiments of the alert interconnect and the alert interface of FIG. 2.
Figure 8:
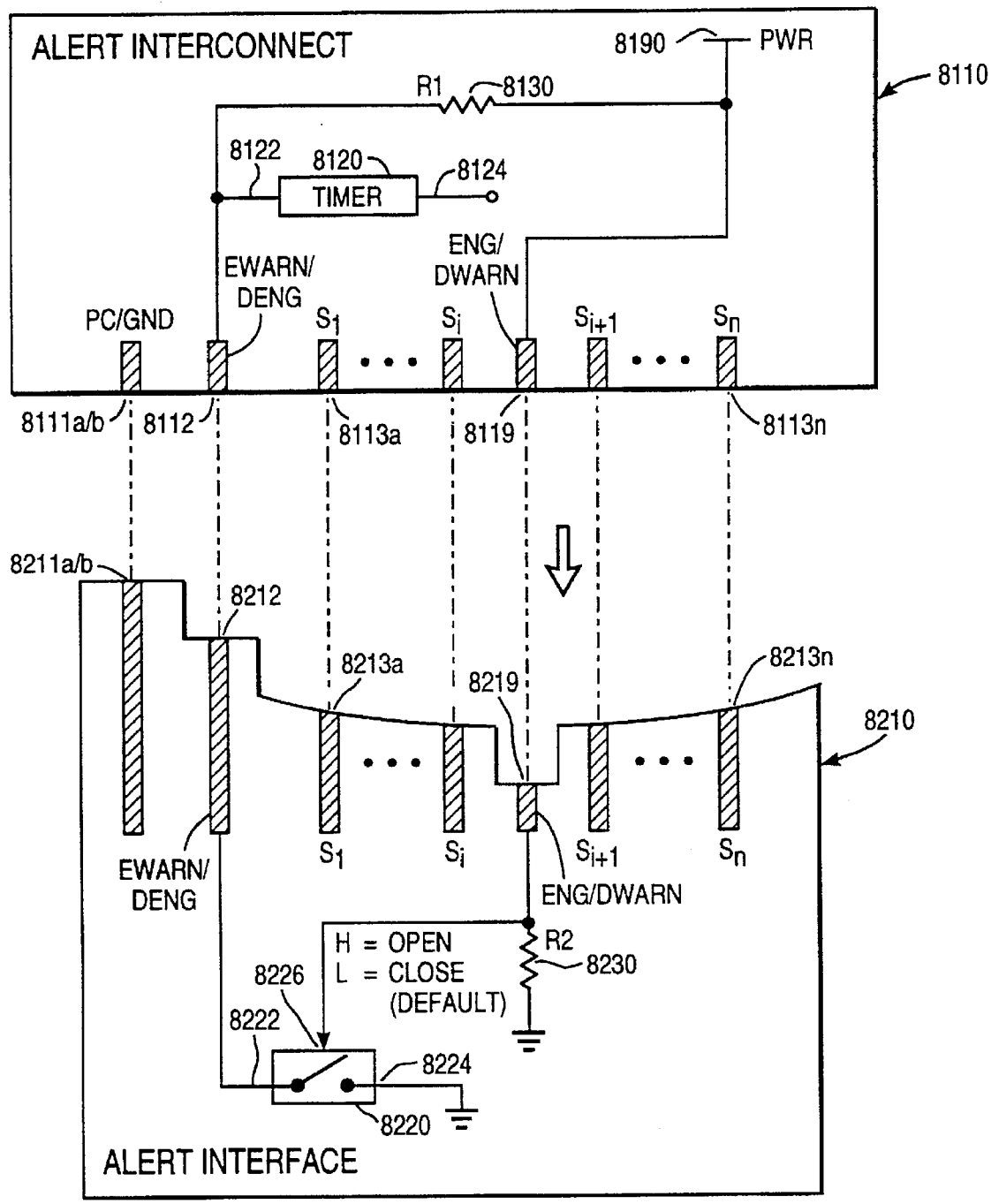

FIGS. 7 and 8 show yet another two embodiments of interfaces 7210, 8210 capable of both hot-plugging and hot-unplugging with their respective interconnects 7110, 8110. Again, ENG connectors double as DWARN connectors while EWARN connectors double as DENG connectors. Hot-unplugging of interface 7210, 8210 is as described above for interface 4210, 5310, respectively. Hot-unplugging of interface 7210 is as described above for interface 6210. In addition, hot-unplugging of interface 8210 is similar to that of interface 6210 except there is one DWARN connector 8219 instead of two DWARN1/2 connectors 6219a, 6219b. Again, by recessing DWARN connectors 7219a, 7219b, and 8219, interfaces 7210, 8210 can be advantageously safely hot-unplugged from interconnect 6110 without any additional circuitry.

Figure 9:
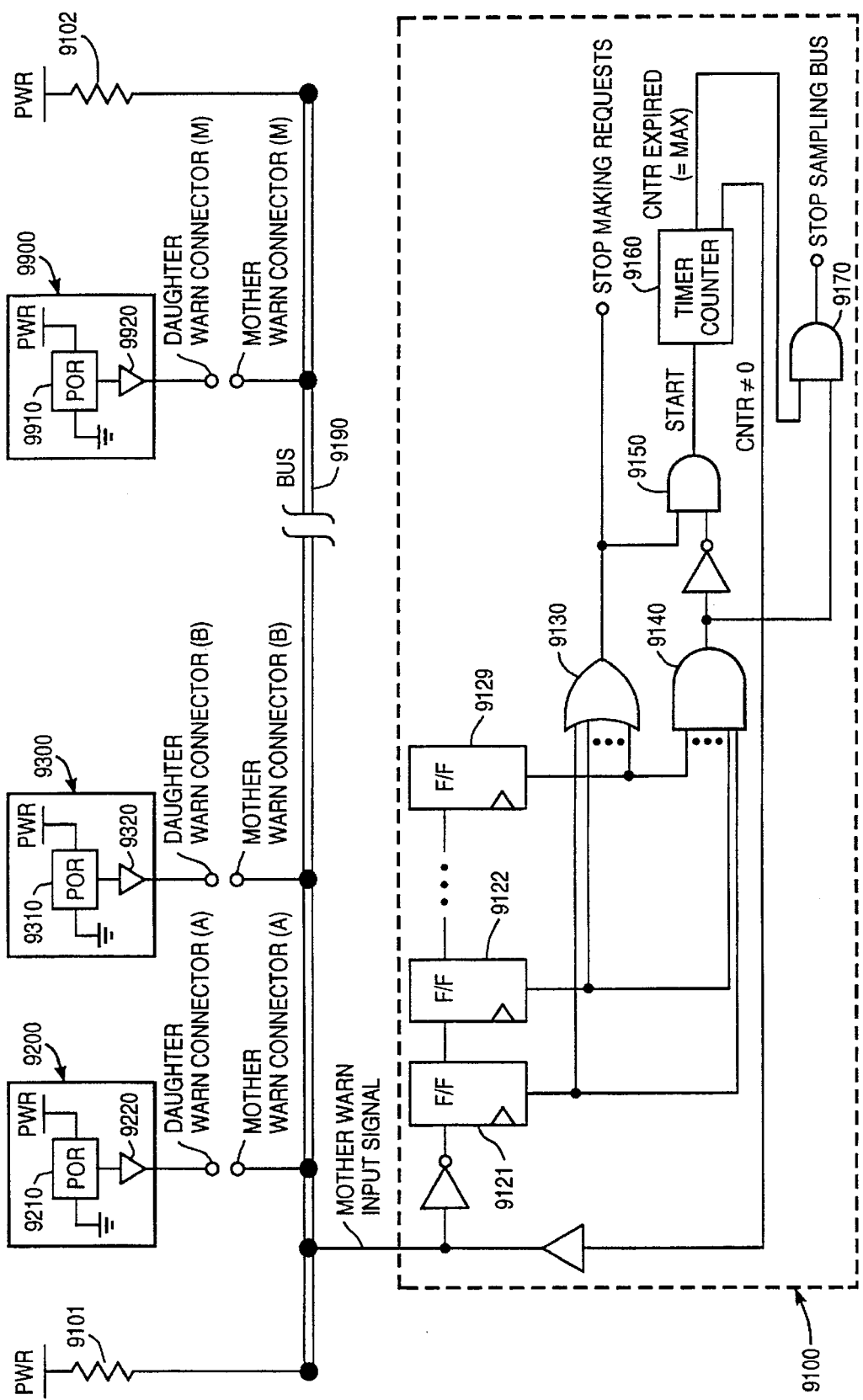
FIGS. 9 and 10 are logic circuits showing two embodiments of the debouncing and timing circuit of the present invention.
Figure 10:
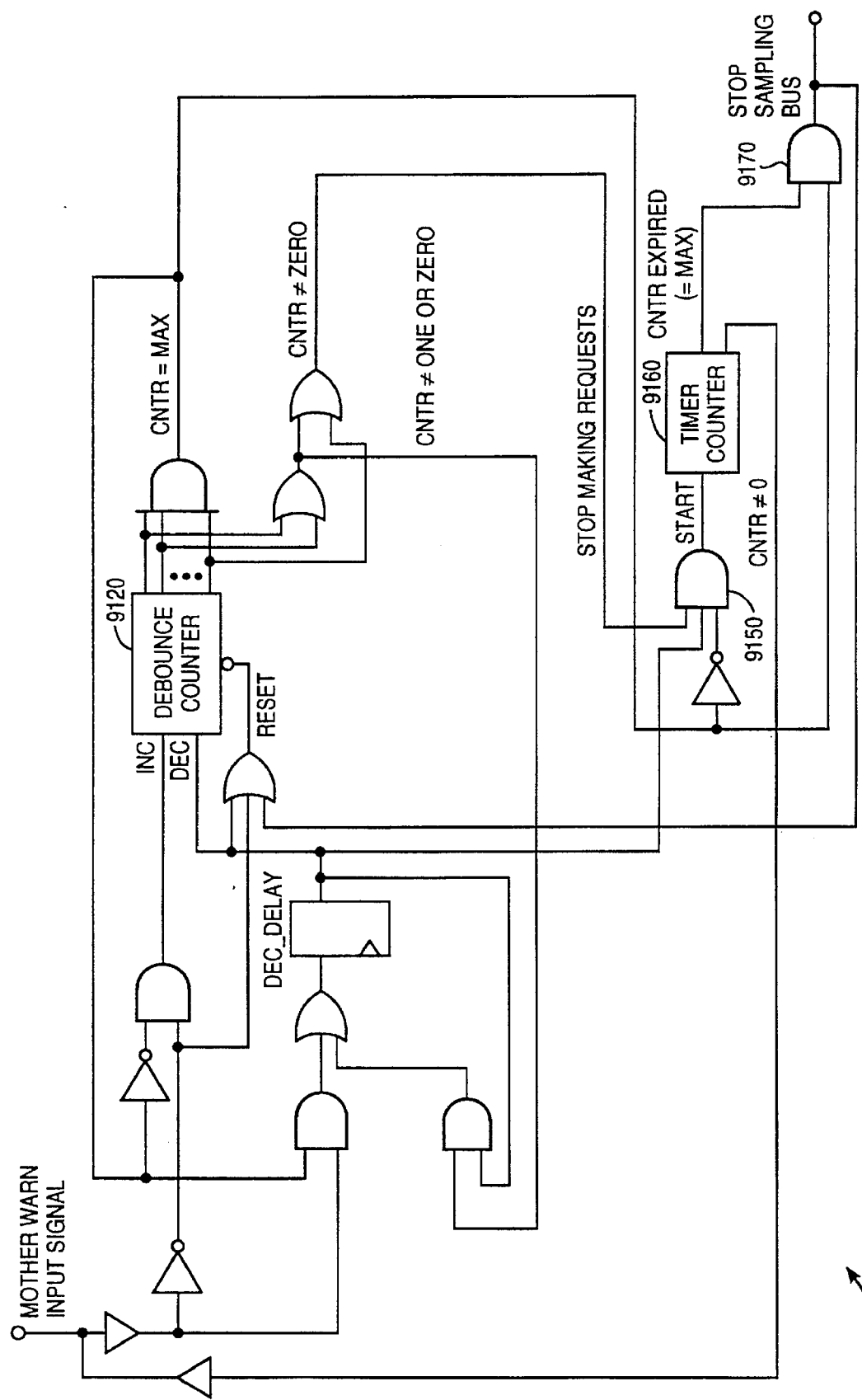

FIGS. 9 and 10 show two exemplary logic circuits for a debouncing and timing circuitry of the present invention.

Referring first to FIG. 9, a conceptual diagram of the debouncing and timing circuitry (DTC) for interconnect 2110, DTC 9100 includes flop/flops (F/Fs) 9121, 9122, . . . 9129, an "OR" gate 9130, an "AND" gate 9140 and a timer counter 9160.

F/Fs 9121, 9122, . . . 9129 form a delay line for debouncing the mother WARN input signal from a WARN bus 9190. Four to sixteen F/Fs provide a satisfactory delay. The respective input OR gate 9130 and AND gate 9140 are coupled to the output nodes of F/Fs 9121, 9122, . . . 9129.

WARN bus 9190 includes mother WARN connectors for mating with the corresponding daughter WARN connectors of alert interfaces 9200, 9300, . . . 9900. Interfaces 9200, 9300, . . . 9900 include Power On Reset (POR) circuits 9210, 9310, . . . 9910, and line drivers 9220, 9320, . . . 9920, respectively.

Operation of DTC 9100 and PORs 9210, 9310, . . . 9910 is as follows. The respective output nodes of POR circuits 9210, 9310, . . . 9910, are LOW when the power rail (PWR) is below a certain voltage threshold. Conversely, the output node of a POR circuit is HIGH when PWR remains above the voltage threshold for a predetermined time period, e.g., 200 msecs. Referring also to FIGS. 3A, 3B, POR circuit 9210 provides the corresponding time delay d2.

Referring back to FIG. 9, when the output node of one or more POR circuits 9210, 9310, . . . 9910 is LOW, the output node of OR gate 9130 is LOW and all outgoing request(s) involving the mother signal connectors (not shown) by interconnect 2110 are halted by asserting the "Stop Making Requests" line. Meanwhile, incoming request(s) can still be received via the mother signal connectors and serviced. Eventually, all F/Fs 9121, 9122, . . . 9129 go HIGH, i.e., a debounced LOW on the mother WARN input signal, and timer counter 9160 is started.

Subsequently, after time delay d2, the mother WARN input signal goes HIGH again (approximately 200 msecs after the ENG connectors mate), and the debounced "Stop Sampling Bus" line is deasserted.

FIG. 10 is another implementation of DTC 9100 which provides the functionality of the DTC of FIG. 9 with fewer components. In this implementation, F/Fs 9121, 9122, . . . 9129 are replaced by a debounce counter 9120. Note that in both implementations, an optional feedback signal, "Timer Counter not equal to 0" from timer counter 9160 is provided to the mother WARN input signal.

Figure 11A:
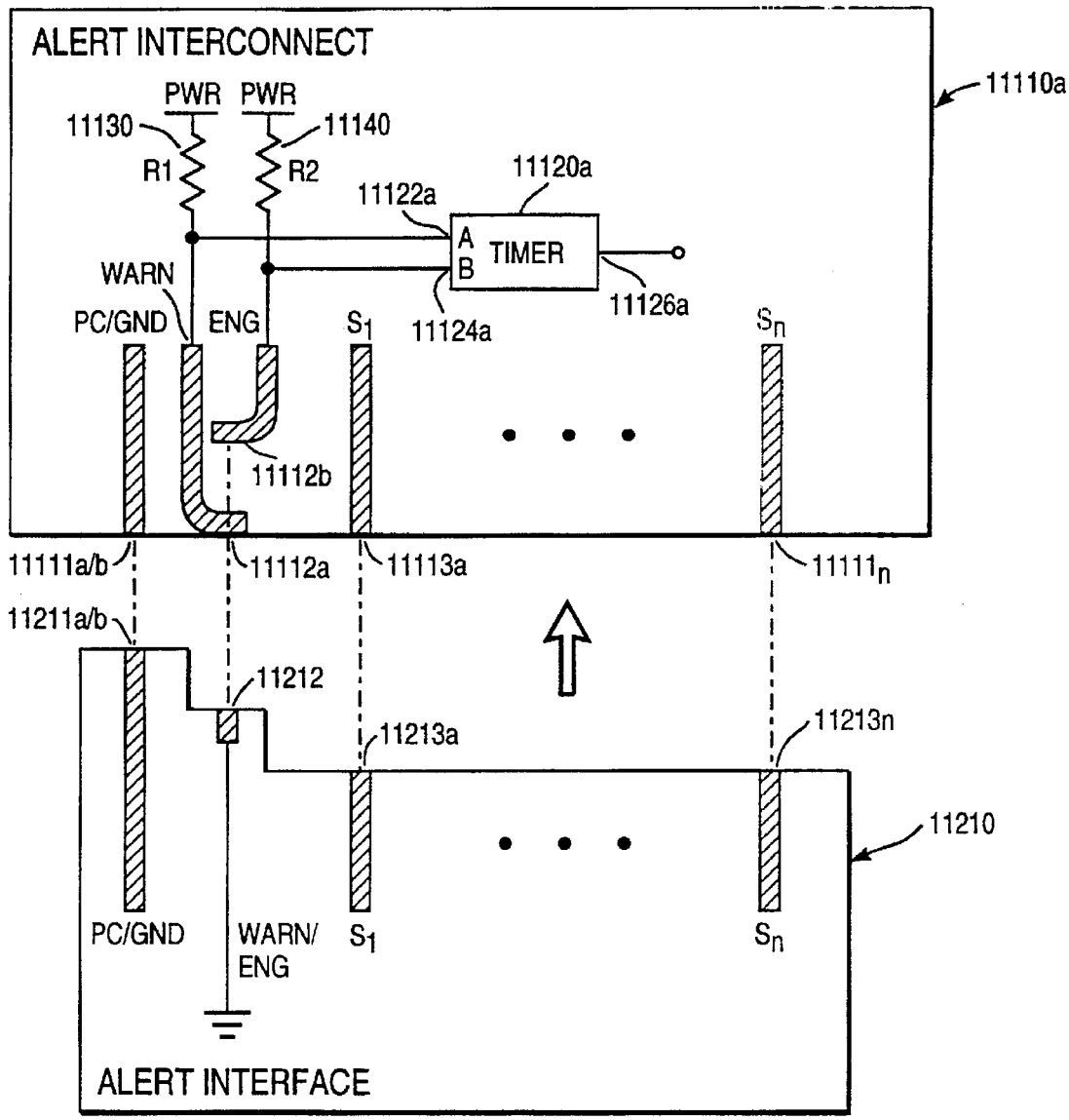
FIGS. 11A and 11B illustrate another variation of the hot-plugging/unplugging scheme of the present invention.
Figure 11B:
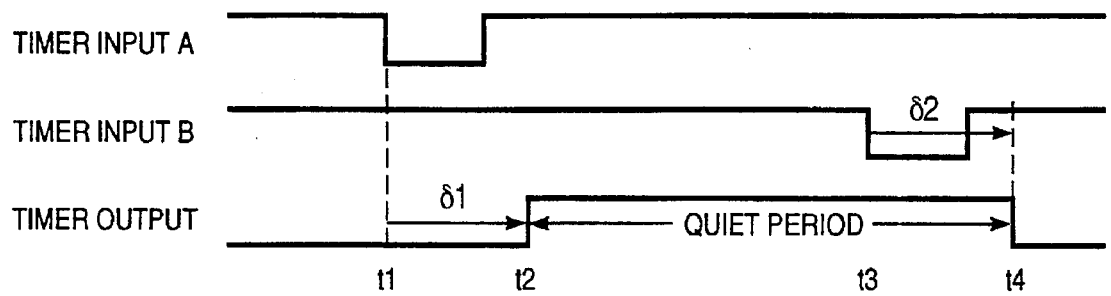

Other modifications and variations in implementing the hot-plugging scheme of the present invention are also possible. In another embodiment as illustrated by FIGS. 11A and 11B, instead of separate daughter warning and engage connectors, it is possible to have a single daughter warning/engage connector deep enough to contact separate mother warning and engage connectors in the following sequence. At time t1, WARN/ENG connector 11212 mates with WARN connector 11112a. Timer 11120a waits for time period d1 before initiating the quiet period at time t2. Meanwhile, between time t1 and t2, WARN/ENG connector 11212 overtakes and uncouples from WARN connector 11112a.

Subsequently, between time t2 and t3, all the signal connectors mate. At time t3, WARN/ENG connector 11212 mates with ENG connector 11112b. Timer 11120a extends the quiet period for time period d2 before terminating the quiet period at time t4. Meanwhile, between time t3 and t4, WARN/ENG connector 11212 overtakes and uncouples from ENG connector 11112b.

Figure 11C:
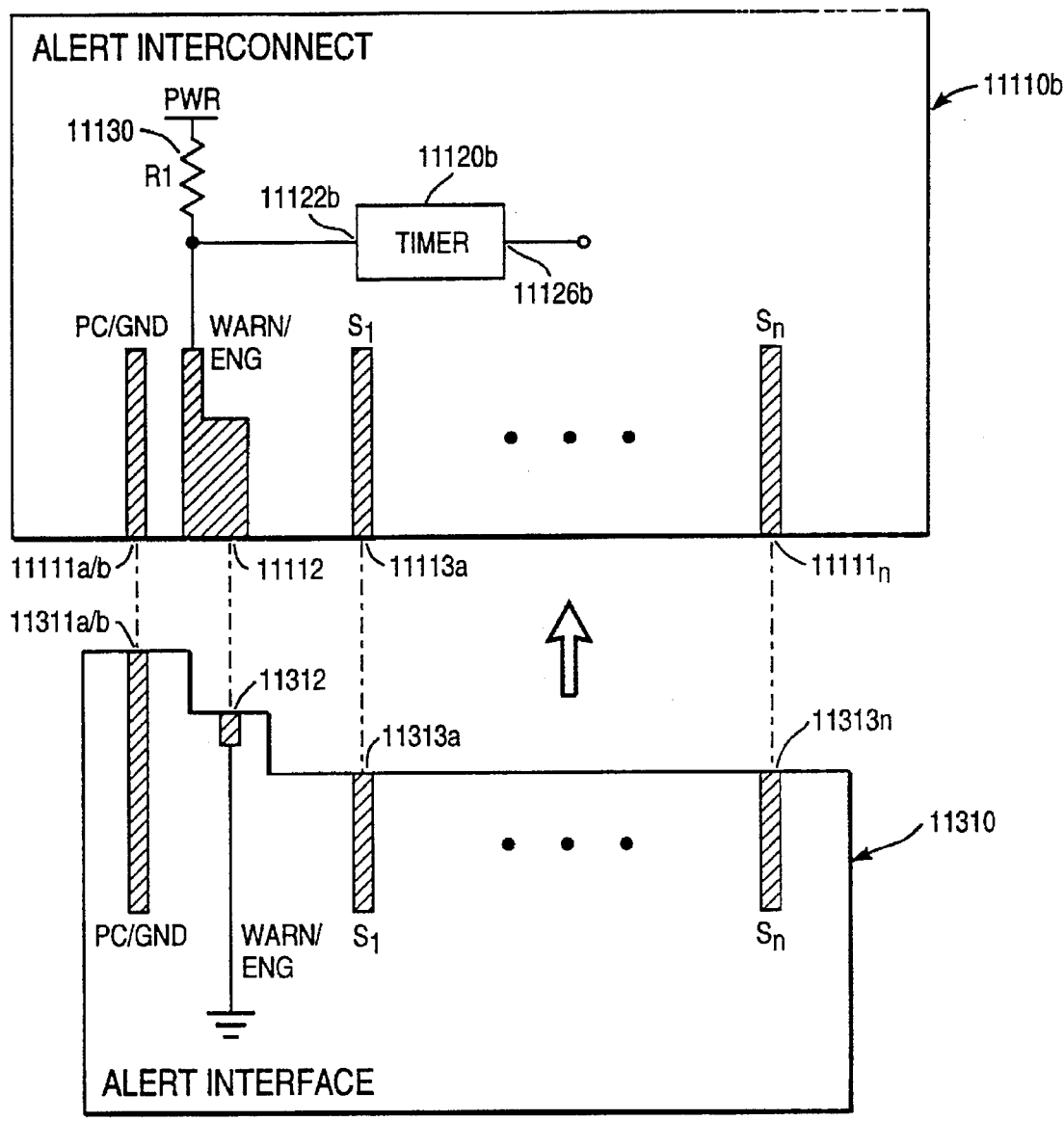
FIG. 11C and 11D illustrate yet another variation of the hot-plugging/unplugging scheme of the present invention.
Figure 11D:
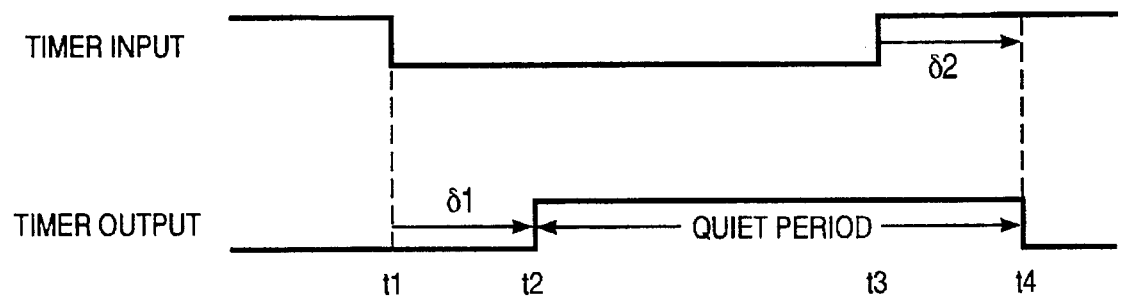

FIGS. 11C and 11D illustrate another embodiment where there is a corresponding pair of WARN/ENG connectors 11112, 11312. The operation is similar to that of the embodiment of FIG. 11A, except instead of mating and then uncoupling from separate WARN and ENG connectors 11112a/b, WARN/ENG connector 11312 mates and then uncouples from a single mother WARN/ENG connector 11112.

Figure 12:
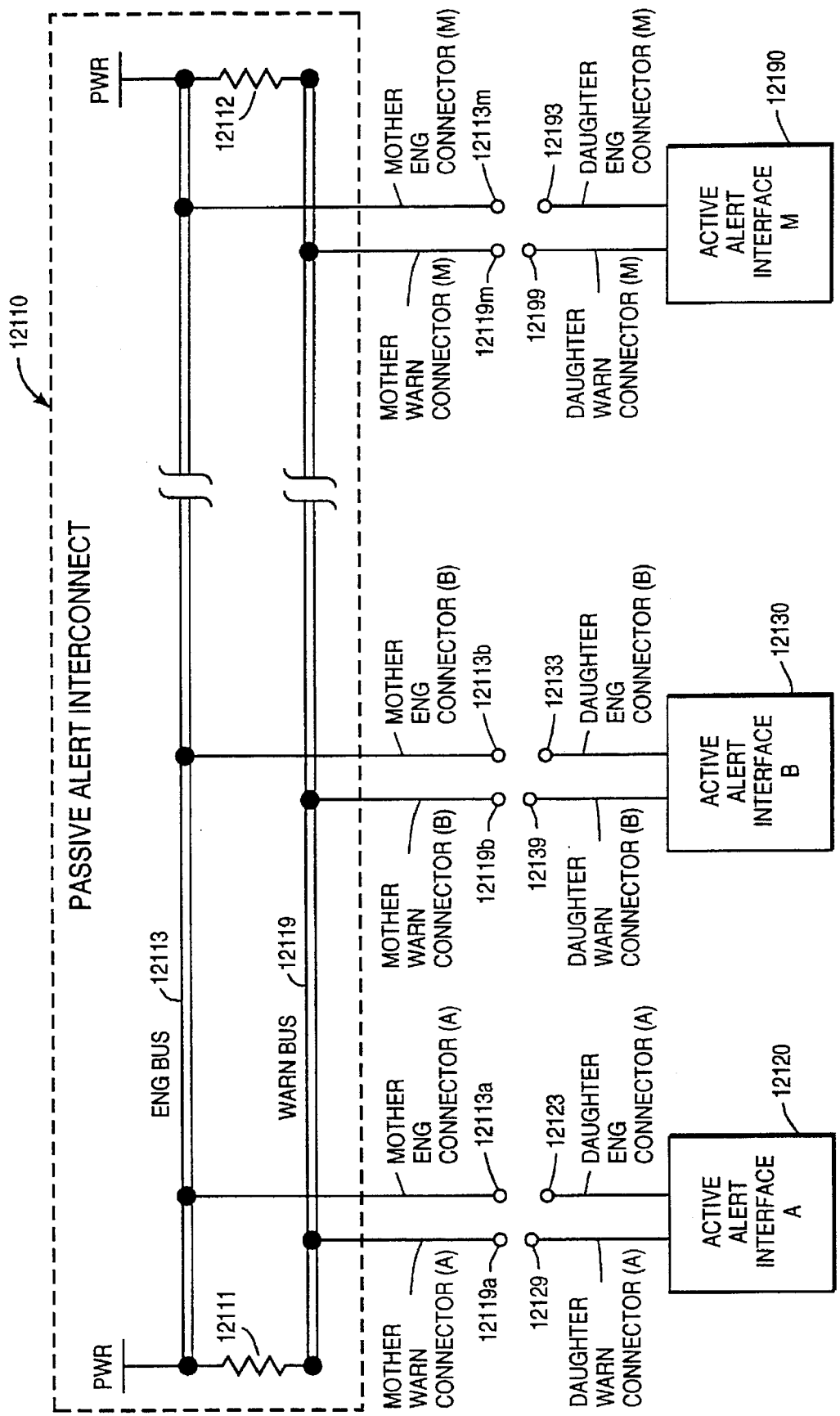
FIG. 12 shows a variation of the hot-plugging/unplugging scheme of the present invention wherein the interconnect is passive and the interfaces are active.

Referring back to FIG. 9, although alert interconnect 9100 and alert interfaces 9200, 9300, ... 9900 are shown as active circuits interconnected by a system bus 9190, other implementations are possible. In yet another embodiment, as shown in FIG. 12, all the active hot-plugging/unplugging circuitry can be located in active alert interfaces 12120, 12130, ... 12190. For example, POR circuit 9210 and debouncing and timing circuit 9100 of FIG. 9 will be located in active alert interface 12120. Accordingly, passive alert interconnect 12110 includes only passive components, e.g., ENG bus 12113, WARN bus 12119 and resistors 12111, 12112.

While the invention has been described with reference to specific embodiments, numerous additions and modifications are possible without departing from the spirit of the invention. For example, instead of recessing the female connectors of the respective alert interfaces, it is possible to recess the male connectors of the alert interconnect. In addition, the interconnect can be male while the interface is female, and vice versa.

Other applications for the hot-pluggable/un-pluggable scheme of the present invention include interconnect/interface combinations such as server/disk drives, integrated circuit (IC) carrier/IC, PCMCIA socket/PCMCIA card, electrical receptacle/plugs, ribbon connector/ribbon cable and LAN network/LAN interface card. For example, hot-plugging a LAN interface card into a token ring environment may generate a "network directory update wang" signal to the existing LAN interface cards. Hence, the scope of the invention should be determined by the following claims.

What is claimed is:

1. A method for hot-plugging an interface of a component to an interconnect of an electrically powered system, the method comprising the steps of:

A) generating an engage warning signal for said powered system, said engage warning signal indicative of an imminent mating of a daughter signal connector of said interface to a mother signal connector of said interconnect;

B) initiating a quiet period for said mother signal connector;

C) begin mating said daughter and said mother signal connectors after step B;

D) generating a first engaged signal for said powered system;

E) generating a second engaged signal for said powered system after step D, said generation of said second engaged signal indicating that said daughter and said mother signal connectors have mated; and F) terminating said quiet period after step E.

2. The method of claim 1 further comprising the steps of precharging said component via said interconnect before step A.

3. The method of claim 1 wherein said step of generating said engage warning signal is preceded by a step of mating a daughter warning connector of said interface to a mother warning connector of said interconnect.

4. The method of claim 1 further comprising the step of generating a first time delay between the generation of the engage warning signal and the initiation of the quiet period.

5. The method of claim 1 wherein said steps of generating said first and said second engaged signals are preceded by steps of mating a first and a second daughter engage connector of said interface to a first and a second mother engage connector of said interconnect, respectively.

6. The method of claim 1 further comprising the step of generating a second time delay between the second engaged signal and the termination of the quiet period.

7. The method of claim 1 further comprising the steps of:

G) generating a second engage warning signal for said powered system after step B and before step C; and H) extending the quiet period for said mother signal connector.

8. A method for hot-unplugging an interface of a component from an interconnect of an electrically powered system, the method comprising the steps of:

A) generating a disengage warning signal for said powered system, said disengage warning signal indicative of an imminent uncoupling of a daughter signal connector of said interface from a mother signal connector of said interconnect;

B) initiating a quiet period for said mother signal connector;

C) begin uncoupling said signal connectors after step B;

D) generating a first disengaged signal for said powered system;

E) generating a second disengaged signal for said powered system after step D, said generation of said second engaged signal indicating that said daughter and said mother signal connectors have uncoupled; and F) terminating said quiet period after step E.

9. The method of claim 8 wherein said step of generating said disengage warning signal is preceded by a step of uncoupling a daughter warning connector of said interface from a mother warning connector of said interconnect.

10. The method of claim 8 further comprising the step of generating a first time delay between the generation of the disengage warning signal and the initiation of the quiet period.

11. The method of claim 8 wherein said steps of generating said first and second disengaged signals are preceded by steps of uncoupling a first and a second disengage connector of said interface to a first and a second disengage connector of said interconnect, respectively.

12. The method of claim 8 further comprising the step of generating a second time delay between the second disengaged signal and the termination of the quiet period.

13. The method of claim 8 further comprising the steps of:

G) generating a second disengage warning signal for said powered system after step B and before step C; and H) extending the quiet period for said mother signal connector.

14. An interface of a component for hot-plugging with an interconnect of an electrically powered system, said interface comprising:

at least two daughter signal connectors;

a daughter warning connector coupled to a circuit configured to generate an engage warning signal from said component indicative of an imminent mating of at least two mother signal connectors of said system with said at least two daughter signal connectors of said component, respectively; and a daughter engage connector configured to mate with a mother engage connector of said interconnect after the respective daughter and mother signal connectors have mated, and wherein said daughter engage connector is located between said at least two daughter signal connectors.

15. The interface of claim 14 wherein said engage warning signal causes a timer to initiate a quiet period for said at least two mother signal connectors, and wherein said mating of said daughter and said mother engage connectors triggers the generation of an engaged signal indicating that the respective daughter and mother signal connectors have mated and causes said timer to terminate said quiet period.

16. The interface of claim 15 further comprising a daughter precharge connector configured to mate width a mother precharge connector of said interconnect before said daughter warning connector mates with a mother warning connector of said interconnect, said daughter precharge connector configured to precharge said component.

17. The interface of claim 14 wherein said daughter engage connector is recessed relative to said at least two daughter signal connectors along a mating edge of said interface.

18. The interface of claim 14 wherein said disengage warning signal causes a timer to initiate a quiet period for said at least two mother signal connectors, and wherein said uncoupling of said daughter and said mother disengage connectors triggers the generation of a disengaged signal indicating that the respective daughter and mother signal connectors have uncoupled and causes said timer to terminate said quiet period.

19. An interface of a component for hot-unplugging with an interconnect of an electrically powered system, said interface comprising:

at least two daughter signal connectors;

a daughter warning connector coupled to a circuit configured to generate a disengage warning signal from said component indicative of an imminent uncoupling of at least two mother signal connectors of said system with said at least two daughter signal connectors of said component, respectively; and a daughter disengage connector configured to uncouple with a mother disengage connector of said interconnect after the respective daughter and mother signal connectors have uncoupled, and wherein said daughter disengage connector is located between said at least two daughter signal connectors.

20. The interface of claim 19 wherein said daughter disengage connector protrudes relative to said at least two daughter signal connectors along a mating edge of said interface.

21. An interface of a component for hot-plugging with an interconnect of an electrically powered system, said interface comprising:

at least one daughter signal connector;

a daughter warning connector coupled to a circuit configured to generate an engage warning signal from said component indicative of an imminent mating of at least one mother signal connector of said system with said at least one daughter signal connector of said component; and a first and a second daughter engage connector configured to mate with a first and a second mother engage connector of said interconnect, respectively, and wherein said at least one daughter signal connector is located between said first and second daughter engage connectors.

22. The interface of claim 21 wherein said at least one daughter signal connector includes at least two daughter signal connectors which are gradually recessed relative to each other along a mating edge of said interface.

23. The interface of claim 21 wherein said first and second daughter engage connectors are recessed relative to said at least one daughter signal connector along a mating edge of said interface.

24. The interface of claim 21 wherein said engage warning signal causes a timer to initiate a quiet period for said at least one mother signal connector and wherein said mating of the respective daughter and mother engage connectors triggers the generation of an engaged signal indicating that the respective daughter and mother signal connectors have mated and causes said timer to terminate said quiet period.

25. The interface of claim 21 further comprising a daughter precharge connector configured to mate with a mother precharge connector of said interconnect before said daughter warning connector mates with a mother warning connector of said interconnect, said daughter precharge connector configured to precharge said component.

26. An interface of a component for hot-unplugging with an interconnect of an electrically powered system, said interface comprising:

at least one daughter signal connector;

a daughter warning connector coupled to a circuit configured to generate a disengage warning signal from said component indicative of an imminent uncoupling of at least one mother signal connector of said system with said at least one daughter signal connector of said component; and a first and a second daughter disengage connector configured to uncouple with a first and a second mother disengage connector of said interconnect, respectively, and wherein said at least one daughter signal connector daughter is located between said first and second daughter disengage connectors.

27. The interface of claim 26 wherein said at least one daughter signal connector includes at least two daughter signal connectors and wherein said at least two daughter signal connectors are gradually recessed relative to each other.

28. The interface of claim 26 wherein said first and second daughter disengage connectors protrude relative to said at least one daughter signal connector along a mating edge of said interface.

29. The interface of claim 26 wherein said disengage warning signal causes a timer to initiate a quiet period for said at least one mother signal connector and wherein said uncoupling of the respective daughter and mother disengage connectors triggers the generation of a disengaged signal indicating that the respective daughter and mother signal connectors have uncoupled and causes said timer to terminate said quiet period.

* * * * *